(12) United States Patent
Davis et al.

(10) Patent No.: US 7,802,206 B1
(45) Date of Patent: Sep. 21, 2010

(54) DYNAMIC SIZING USER INTERFACE METHOD AND SYSTEM FOR DATA DISPLAY

(75) Inventors: Mark Davis, Mill Valley, CA (US); Carlo Bernoulli, New York, NY (US)

(73) Assignee: Palm, Inc., Sunnyvale, CA (US)

( * ) Notice: Subject to any disclaimer, the term of this patent is extended or adjusted under 35 U.S.C. 154(b) by 990 days.

(21) Appl. No.: 10/665,892

(22) Filed: Sep. 19, 2003

Related U.S. Application Data

(60) Provisional application No. 60/467,794, filed on May 1, 2003.

(51) Int. Cl.
G06F 3/14 (2006.01)

(52) U.S. Cl. .................. 715/864; 715/781; 715/800; 715/788; 345/156

(58) Field of Classification Search .......... 715/864, 715/788, 794, 781, 800; 345/854, 123, 156
See application file for complete search history.

(56) References Cited

U.S. PATENT DOCUMENTS

| | | |
|---|---|---|
| 4,279,021 A | 7/1981 | See et al. |
| 4,415,065 A | 11/1983 | Sandstedt |
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,916,441 A | 4/1990 | Gombrich |
| 5,010,547 A | 4/1991 | Johnson et al. |
| 5,012,219 A | 4/1991 | Henry |
| D320,598 S | 10/1991 | Auerbach et al. |
| 5,067,164 A | 11/1991 | Denker et al. |
| 5,075,684 A | 12/1991 | DeLuca |
| 5,101,439 A | 3/1992 | Kiang |
| 5,109,539 A | 4/1992 | Inubushi et al. |
| D326,451 S | 5/1992 | Roegner |
| 5,218,188 A | 6/1993 | Hanson |
| 5,227,614 A | 7/1993 | Danielson et al. |

(Continued)

FOREIGN PATENT DOCUMENTS

EP 0149762 A1 7/1986

(Continued)

OTHER PUBLICATIONS

"Microsoft", Microsoft Windows & MS-DOS User's Guide, (1993),p. 19,26.

(Continued)

*Primary Examiner*—Steven B Theriault
*Assistant Examiner*—Tuyetlien T Tran
(74) *Attorney, Agent, or Firm*—Kacvinsky Daisak, PLLC

(57) ABSTRACT

Embodiments of the present invention relate to methods and devices for displaying information in a handheld device, comprising displaying information in a dynamically sizable cell in the display of the handheld device, wherein the cell comprises a portion of the display and the size of the cell is adjusted in response to the amount of information it contains. Embodiments of the present invention are enabled to display the information in a plurality of dynamically sizable cells which display different categories of information. Embodiments are also enabled to adjust cell size in response to the size of the other cells in the display.

11 Claims, 23 Drawing Sheets

U.S. PATENT DOCUMENTS

| | | | |
|---|---|---|---|
| 5,235,561 A | 8/1993 | Seager | |
| 5,307,086 A | 4/1994 | Griffin et al. | |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |
| 5,357,065 A | 10/1994 | Mitamura et al. | |
| 5,359,317 A | 10/1994 | Gomez et al. | |
| 5,379,057 A | 1/1995 | Clough et al. | |
| 5,381,387 A | 1/1995 | Blonder et al. | |
| 5,392,447 A | 2/1995 | Schlack et al. | |
| 5,394,140 A | 2/1995 | Wong et al. | |
| D359,920 S | 7/1995 | Skamoto | |
| 5,440,629 A | 8/1995 | Gray | |
| 5,442,406 A | 8/1995 | Altmanshofer et al. | |
| 5,465,401 A | 11/1995 | Thompson | |
| 5,494,363 A | 2/1996 | Hochgesang | |
| 5,503,484 A | 4/1996 | Louis | |
| 5,510,808 A | 4/1996 | Cina, Jr. | |
| 5,584,054 A | 12/1996 | Tyneski et al. | |
| 5,612,682 A | 3/1997 | DeLuca et al. | |
| 5,619,555 A | 4/1997 | Fenton et al. | |
| 5,627,978 A | 5/1997 | Altom et al. | |
| 5,650,776 A | 7/1997 | Mitchell et al. | |
| 5,705,995 A | 1/1998 | Laflin et al. | |
| 5,719,936 A | 2/1998 | Hillenmayer | |
| 5,742,894 A | 4/1998 | Jambhekar et al. | |
| 5,745,904 A | 4/1998 | King et al. | |
| 5,754,636 A | 5/1998 | Bayless et al. | |
| 5,779,030 A | 7/1998 | Ikegami et al. | |
| 5,797,089 A | 8/1998 | Nguyen | |
| 5,797,098 A | 8/1998 | Schroeder et al. | |
| 5,809,115 A | 9/1998 | Inkinen | |
| 5,812,651 A | 9/1998 | Kaplan | |
| 5,813,778 A | 9/1998 | Shi | |
| 5,815,142 A | 9/1998 | Ailard et al. | |
| 5,848,356 A * | 12/1998 | Jambhekar et al. | 455/403 |
| 5,860,074 A | 1/1999 | Rowe et al. | |
| 5,873,108 A * | 2/1999 | Goyal et al. | 715/507 |
| 5,903,852 A | 5/1999 | Schaupp, Jr. et al. | |
| 5,917,905 A | 6/1999 | Whipple et al. | |
| 5,917,906 A | 6/1999 | Thornton | |
| 5,922,071 A | 7/1999 | Taylor et al. | |
| 5,941,648 A | 8/1999 | Robinson et al. | |
| 5,949,764 A | 9/1999 | Yoshida et al. | |
| 5,958,006 A | 9/1999 | Eggleston et al. | |
| 5,974,334 A | 10/1999 | Jones, Jr. | |
| D416,256 S | 11/1999 | Griffin et al. | |
| 6,002,944 A | 12/1999 | Beyda | |
| 6,006,109 A | 12/1999 | Shin | |
| 6,009,338 A | 12/1999 | Iwata et al. | |
| 6,016,142 A | 1/2000 | Chang et al. | |
| 6,018,571 A | 1/2000 | Langlois et al. | |
| 6,029,072 A | 2/2000 | Barber | |
| 6,035,214 A | 3/2000 | Henderson | |
| 6,055,439 A | 4/2000 | Helin et al. | |
| 6,058,304 A | 5/2000 | Callaghan et al. | |
| 6,064,734 A | 5/2000 | Hasegawa et al. | |
| 6,084,951 A * | 7/2000 | Smith et al. | 379/93.17 |
| 6,097,391 A | 8/2000 | Wilcox | |
| 6,101,531 A | 8/2000 | Egglestorl et al. | |
| 6,119,179 A | 9/2000 | Whitridge et al. | |
| 6,133,916 A | 10/2000 | Bukszaar et al. | |
| 6,137,469 A | 10/2000 | Wu et al. | |
| 6,157,630 A | 12/2000 | Adler et al. | |
| 6,166,342 A | 12/2000 | Chou | |
| 6,169,911 B1 | 1/2001 | Wagner et al. | |
| 6,188,917 B1 | 2/2001 | Laureanti | |
| 6,192,118 B1 | 2/2001 | Bayless et al. | |
| 6,198,053 B1 | 3/2001 | Chou | |
| 6,208,879 B1 | 3/2001 | Iwata et al. | |
| 6,215,865 B1 | 4/2001 | McCalmont | |
| 6,233,469 B1 | 5/2001 | Watanabe | |
| 6,243,452 B1 | 6/2001 | O'Shaughnessey et al. | |
| 6,256,631 B1 | 7/2001 | Malcolm | |
| 6,259,449 B1 | 7/2001 | Saxena et al. | |
| 6,262,716 B1 | 7/2001 | Raasch | |
| 6,295,372 B1 | 9/2001 | Hawkins et al. | |
| 6,297,795 B1 * | 10/2001 | Kato et al. | 345/684 |
| 6,297,945 B1 | 10/2001 | Yamamoto | |
| 6,310,609 B1 | 10/2001 | Morgenthater | |
| 6,317,313 B1 | 11/2001 | Mosgrove et al. | |
| 6,317,781 B1 | 11/2001 | De Boor et al. | |
| 6,333,973 B1 | 12/2001 | Smith et al. | |
| D454,349 S | 3/2002 | Makidera et al. | |
| 6,370,018 B1 | 4/2002 | Miller, Jr. et al. | |
| D456,794 S | 5/2002 | Laverick et al. | |
| 6,389,124 B1 | 5/2002 | Schnarel et al. | |
| 6,405,172 B1 | 6/2002 | Baker et al. | |
| 6,414,679 B1 | 7/2002 | Miodonski et al. | |
| 6,415,138 B2 * | 7/2002 | Sirola et al. | 455/90.1 |
| 6,442,263 B1 | 8/2002 | Beaton et al. | |
| D462,354 S | 9/2002 | Kimbre et al. | |
| 6,452,588 B2 | 9/2002 | Griffin et al. | |
| D464,962 S | 10/2002 | MacGregor et al. | |
| 6,469,910 B2 | 10/2002 | Lefort | |
| 6,483,445 B1 | 11/2002 | England | |
| 6,502,090 B1 | 12/2002 | Raisanen | |
| D468,714 S | 1/2003 | Maruska et al. | |
| 6,512,507 B1 | 1/2003 | Furihata et al. | |
| D470,842 S | 2/2003 | Bhatia et al. | |
| 6,516,202 B1 | 2/2003 | Hawkins et al. | |
| D471,559 S | 3/2003 | De Saulles | |
| 6,535,749 B1 | 3/2003 | Iwata et al. | |
| 6,549,194 B1 | 4/2003 | McIntyre et al. | |
| 6,557,004 B1 | 4/2003 | Ben-Shathar et al. | |
| 6,577,721 B1 | 6/2003 | Vainio et al. | |
| 6,583,806 B2 | 6/2003 | Ludwig et al. | |
| D477,597 S | 7/2003 | Laverick et al. | |
| 6,636,203 B1 * | 10/2003 | Wong et al. | 345/173 |
| 6,643,124 B1 | 11/2003 | Wilk | |
| 6,661,404 B1 | 12/2003 | Sirola et al. | |
| D488,478 S | 4/2004 | Laverick et al. | |
| 6,724,403 B1 * | 4/2004 | Santoro et al. | 715/765 |
| 6,781,575 B1 * | 8/2004 | Hawkins et al. | 345/173 |
| 6,792,090 B1 * | 9/2004 | Kobayashi | 379/142.17 |
| 6,819,304 B2 | 11/2004 | Branson | |
| 6,947,158 B1 | 9/2005 | Kitamura et al. | |
| 6,961,593 B1 | 11/2005 | Lonka et al. | |
| 6,973,217 B2 | 12/2005 | Bolick et al. | |
| 6,976,217 B1 | 12/2005 | Vertaschitsch | |
| 7,007,239 B1 | 2/2006 | Hawkins et al. | |
| 7,069,056 B2 | 6/2006 | Iwata et al. | |
| 7,155,419 B2 * | 12/2006 | Blackman et al. | 705/80 |
| 7,231,208 B2 | 6/2007 | Robertson et al. | |
| 7,295,852 B1 | 11/2007 | Davis et al. | |
| 7,359,493 B1 | 4/2008 | Wang et al. | |
| 7,624,351 B2 | 11/2009 | Unger et al. | |
| 2001/0034222 A1 | 10/2001 | Roustaei et al. | |
| 2002/0042853 A1 | 4/2002 | Santoh et al. | |
| 2002/0082043 A1 | 6/2002 | Wilska et al. | |
| 2002/0089546 A1 * | 7/2002 | Kanevsky et al. | 345/800 |
| 2002/0115478 A1 | 8/2002 | Fujisawa et al. | |
| 2002/0441361 | 8/2002 | Griffin et al. | |
| 2002/0133378 A1 * | 9/2002 | Mault et al. | 705/3 |
| 2002/0154745 A1 | 10/2002 | Shtivelman | |
| 2002/0169924 A1 | 11/2002 | Osborn | |
| 2002/0191160 A1 | 12/2002 | Chuang | |
| 2003/0008679 A1 | 1/2003 | Iwata et al. | |
| 2003/0034987 A1 | 2/2003 | Webb et al. | |
| 2003/0064751 A1 * | 4/2003 | Charlier et al. | 455/557 |
| 2003/0112225 A1 | 6/2003 | Granberg | |
| 2003/0122779 A1 | 7/2003 | Martin et al. | |
| 2003/0228863 A1 | 12/2003 | Vander Veen et al. | |

| | | | |
|---|---|---|---|
| 2003/0228888 | A1 | 12/2003 | Adamson |
| 2004/0008827 | A1 | 1/2004 | Martin et al. |
| 2004/0023643 | A1 | 2/2004 | Vander Veen et al. |
| 2004/0026136 | A1* | 2/2004 | Hill et al. ............... 178/18.01 |
| 2004/0028192 | A1 | 2/2004 | Pelletier |
| 2004/0028199 | A1 | 2/2004 | Carlson |
| 2004/0039794 | A1 | 2/2004 | Biby et al. |
| 2004/0061706 | A1* | 4/2004 | Cronin et al. ............... 345/629 |
| 2004/0062367 | A1 | 4/2004 | Fellenstein et al. |
| 2004/0155909 | A1* | 8/2004 | Wagner ............... 345/854 |
| 2004/0203977 | A1 | 10/2004 | Kennedy |
| 2004/0240163 | A1* | 12/2004 | Adams et al. ............... 361/681 |
| 2004/0268263 | A1* | 12/2004 | Van Dok et al. ............ 715/733 |
| 2005/0267975 | A1* | 12/2005 | Qureshi et al. .............. 709/229 |
| 2006/0015819 | A1 | 1/2006 | Hawkins et al. |
| 2006/0033706 | A1 | 2/2006 | Haitani et al. |
| 2006/0121938 | A1 | 6/2006 | Haitani et al. |
| 2006/0160566 | A1 | 7/2006 | Plahte et al. |
| 2006/0161858 | A1 | 7/2006 | Hawkins et al. |
| 2006/0168539 | A1 | 7/2006 | Hawkins et al. |
| 2007/0209019 | A1* | 9/2007 | Kaval et al. ................ 715/788 |

FOREIGN PATENT DOCUMENTS

| | | |
|---|---|---|
| EP | 0704788 A2 | 4/1996 |
| FR | 2760933 | 9/1998 |
| WO | WO9908238 A1 | 2/1999 |
| WO | WO0113605 A2 | 2/2001 |

OTHER PUBLICATIONS

Cowart, R., Mastering Windows 95- The Windows 95 Bible, (1995),110-117,352-359.
Dyszel, B., "Handspring Visor for Dummies", IDG Books Worldwide,Inc, (2000),p. 13, 15, 121, 122, 123,208.
Plumley, B., "Ten Minute Guide to Windows NT Workstation 4.0", Que, (Aug. 1996).
"Excerpts from Handspring VisorPhone(TM) User's Guide, Copyright 2000 Handspring, Inc."
"Excerpts from Ericsson Mobile Phone 1888 World User's Guide, Copyright 1998 Ericsson Mobile Communications AB".
Ikeya, B. "Detailed Overview of the PC Card Standard, PCMCIA", http://www.pcmcia.org/pccarcJstandard.htm., (1998).
"Introduction to PCMCIA Technical Tutorial, Dec. 6, 2002. pp. 1-11."
"Nokia Introduces Mobile Chat With Nokia 3310", http://www.mobiletechnews.com/info/2000/09/01/1_42022.htm, (Sep. 1, 2000).
"Nokia, Frequently Asked Questions", http://www.nokia.co.in/nokiaapac/india/faqs_list/0,18778,39_41,00.html.
Kanellos, M. "Qualcomm Merges Phone, Handheld", CNET News.com, Sep. 21, 1998, http://www.news.com/Qualcomm+merges+phone%2C+handheld/2100-1001_3-215791.html.
"PCT International Search Report", PCT/US2000/22182, (Jan. 10, 2001),8 pages.
"PCT Notification of Transmittal of International Preliminary Examination Report", PCT/US2000/22182, (Oct. 26, 2001),6 pages.
"pdQ (TM) Basics Handbook", Qualcomm Incorporated,, (1998, 1999),96 pages.
MacNeill, D. "Messaging Card and NewtonMail: We Pick Up and Deliver", On The Go Magazine, http://www.pencomputing.com/Newton/NewtonNotes2.html. 2 pages.
Powell, E. "Kyocera pdQ Smartphone—Brief Article—Product Announcement,", http://www.findarticles.com/plartjdes/mjmOFAUTis917/ai65650619/print., (2000).
MacNeill, D. "Wireless Newton Technology Goes to Work", On The Go Magazine, Oct. 13, 1993, 2 pages, http://www.pencomputing.com/Newton/NewtonNotes2.html.
"Qualcomm pdQ (TM) 1900 Digital PCTS SmartPhone", Qualcomm Incorporated, (1999),2 pages.
Schlender, B. R., "Hot News PCs That Read Your Writing", Fortune, Reprinted,(Feb. 11, 1991),6 pages.

Shah, R. "The Qualcomm pdQ: Kill Two Birds with One Phones", CNN.com, http://archives.cnn.com/i999rrECHJptechJi2/o3/qualcomm.pdq,(Dec. 3, 1999).
Stock, R. "The World of Messaging An Introduction to Personal Communications", EO, Inc., Mountain View,(1992, 1993),pp. ii-69.
"The Handheld Computing Industry—2000", Stanford Technology Ventures Program (STVP), (Jan. 13, 2001),pp. 1-38.
"T-Mobile Products; Handhelds", http://www.tmobile.com, (Sep. 28, 2002),2 pages.
"T-Mobile Products; Sidekick", http://www.tmobile.com, Sep. 28, 2002,3 pages.
"Toshiba Computer Systems Group", http://www.toshiba.com, (May 28, 2002), 1 page.
"Toshiba Computer Systems Group: Pocket PC e570", http://www.pda.toshiba.com, (Jul. 7, 2001),2 pages.
"Excerpts from Motorola Timeport Tri-Band Mobile Telephone Manual, Copyright 1999 Motorola, Inc."
"PCT International Search Report", Publication WO 01/13605 A3, (Feb. 22, 2001).
Sato, Larry "Non-Contact Sensor For Servo Track Writer", Company Business and Marketing, (Apr. 2000),2.
Hinckley, Ken et al., "Sensing Techniques for Mobile Interaction", CHI Letters, vol. 2,2, (2000),91-100.
"Printout of various website pages from www.bestnetcall.com regarding pdaCall (patent pending), printed Aug. 31, 2001".
"Printout of various websites pages from biz.yahoo.com article "Conference Calling Added to BestNet's Service Designed for Palm OS(R) Handhelds"—Tuesday, Aug. 21, 2001".
""An Introduction to Mobile Messaging," Mobile Messaging, May 2003, [online] [Retrieved on Dec. 10, 2004] Retrieved from the Internet: URL: http://www.lebodic.netlintro.htm".
"3GPP2 Multimedia Messaging System—MMS Specification Overview—Revision: A. Mobile Messaging, May 2003, [online] [Retrieved on Dec. 10, 2004] Retrieved from the internet: URL: http://www.lebodic.net/left.htm".
Agrawal, P. et al., "Get Wireless: A Mobile Technology Spectrum", IT PRO, IEEE, (Jul./Aug. 1999), 18-23.
"American Programmer, American Programmer, Inc., NY", (Dec. 1991),4-33.
"At Last, Technology Harnesse [sic] One of the Most Powerf [sic] Forces known to Men.", GO Corporation, 14 pages, Foster City,(1991).
"AT&T New Release, NCR Cuts Price of 3170 Notebook Computer 11 to 19 Percent", 2 pages, [online], retrieved from the Internet: URL: http://www.att.com/press/0393/930308.nca.html., (Mar. 8, 1993).
Caar, R.M. "The Point of the Pen", Byte, Reprinted, Feb. 1991, 10 pages.
Chan, E. et al., "Personal Digital Assistants & Wireless Convergence", MGMT 557 Strategic Management of Innovation, (May 4, 2000),1-28.
"Communications Solutions (TM) TMC Labs Test Drive, Mar. 2000", Retrieved from the Internet: URL: https://www.tmcnet.com/articles/comsol/0300/0300labs1.htm.
"Definition of Handheld Computer, printed from the website: http://dictionary.reference.com, dated Feb. 11, 2004 (3 pgs)."
"Definition of Handheld, printed from the website: http://searchmobilecomputing.techtarget.com, dated Feb. 11, 2004 (3 pgs)."
Cullen, A. "Connecting with Your EO Cellular Module", EO, Inc. Mountain View., (1992, 1993),ii-33.
Cullen, A. "Getting started with Your EO Personal Communicatior", EO, Inc., Mountain View, (1992, 1993),ii-74.
Cullen, A. "Lookup Guide to the EO Personal Communicator", EO, Inc., Mountain View., (1992, 1993),ii-320.
"GO Corporation Information Statement, 218 pages", (Nov. 8, 1993).
"Handheld Game Console—Wikipedia, the free encyclopedia, [online] [Retrieved on Oct. 13, 2006], Retrieved from the Internet: URL: http://en.wikipedia.org/wjkwHandheld_game_console."
"Hewlett Packard, Products and Services, http://www.hp.com/, Nov. 11, 2001."
"IBM Selects Racotek Data/Voice Communications Services to Interface with Touchmobile Product, PR Newswire, Jan. 26, 1993, 2 pages."

"IBM TouchMobile Solution for Data Capture and Communication, Keeping Your Business Moving in the 90s, International Business Machines Incorporated, Jan. 1993, 13 pages."
"IBM TouchMobile Information and Planning Guide, International Business Machines Incorporated, Mar. 1993, 20 pages."

\* cited by examiner

DYNAMIC SIZING USER INTERFACE METHOD AND SYSTEM FOR DATA DISPLAY

RELATED U.S. APPLICATIONS

This application incorporates herein by reference, and claims priority to, the commonly-owned co-pending provisional patent application U.S. Ser. No. 60/467,794, entitled "MULTI-MODE CONFERENCE CALL SETUP AND MANAGEMENT AND DATA BROWSING USER INTERFACE TECHNIQUE ('MULLET DATEBOOK') AND DYNAMIC SIZING USER INTERFACE TECHNIQUE FOR DATA DISPLAY AND TEXT-KEY CUSTOMIZATION FOR AUDIO MENU SELECTION," filed May 1, 2003, and to the commonly-owned U.S. Pat. No. 6,516,202 B1, entitled "MOBILE COMPUTER SYSTEM DESIGNED FOR WIRELESS COMMUNICATION EXPANSION," issued on Feb. 4, 2003, and assigned to the assignee of the present invention.

FIELD OF THE INVENTION

The present invention relates to the field of user interaction with data displayed in handheld portable electronic devices.

BACKGROUND OF THE INVENTION

As the components required to build a computer system have reduced in size, new categories of computer systems have emerged. A relatively recent category of computer system is the portable or handheld computer device. A handheld computer system is a computer that is small enough to be held in the hand. As a result, these devices are readily carried about in a briefcase or purse, and some handheld devices are compact enough to fit into a person's pocket. By virtue of their size, handheld computer systems are also lightweight and so are exceptionally portable and convenient.

Further development of handheld devices has enabled their use for more and more tasks. For example, portable, and even wireless, access to computer networks is now readily available with suitably configured devices. The portability and convenience of handheld devices has enabled the even more exciting possibilities encompassed by the combination of the capabilities of handheld devices with the communication convenience of wireless telephones, e.g. cellular phones.

As more and more of these devices are carried in everyday activities, the demand for more and more capability from these versatile machines also grows. The demanding environment of modern working life sometimes requires multi-tasking by the individual, requiring a careful scheduling of daily events as well as the events of the busy workplace, often using the assistance of planning or scheduling aids or planners. Often these weekly and monthly planners need to be accessed while the user is on the go.

As convenient as handheld computing devices are, users demand ease of use. Often a simple task such as quickly checking the time of an upcoming event, scheduling a meeting, or checking a meeting attendance list or agenda topic requires two hands and a convenient lap or desk. This is often caused by the existence of more relevant data than is displayed in the existing display view. It would be desirable to simplify the graphical user interface experience for a user and present helpful daily information in an intuitive manner.

SUMMARY OF THE INVENTION

Accordingly, embodiments of the present invention are directed to a method and system for viewing daily information, e.g., messages from others, to-do data and organized calendar data in a database. The method can be implemented in a portable computing device, such as a handheld computing device, and user input to navigate through the database can be accepted by alpha-numeric input, touch-screen display tactile input or by five-way navigation button, for example.

Embodiments of the present invention relate to methods and devices for displaying information in a handheld device, comprising displaying information in a dynamically sizable cell in the display of the handheld device, wherein the cell comprises a portion of the display and the size of the cell is adjusted in response to the amount of information it contains. Embodiments of the present invention are enabled to display the information in a plurality of dynamically sizable on-screen displayed cells or windows which display different categories of information. Embodiments are also enabled to adjust cell size in response to the size of the other cells in the display and/or based on the data to be displayed and/or user defined cell display options.

Embodiments of the present invention are also presented which are enabled to present windows or cells that include a list of appointments, a list of daily tasks to accomplish and an email window. The combination of cells can be referred to as a "Today View" in some embodiments, and can show information a user needs to know for the ensuing twenty four hours. Embodiments can also display a clock with events, To-Do items, and messages that will impact or are useful to the user over the next twenty four hours.

When Today View displays information, it uses a pointer system that adjusts what is displayed on-screen based on how much information needs to be displayed, and from what application. When ranking information, a focus is to convey scheduling information, such as for appointments or events. The second focus of data to convey is To-Do items, and the last is messaging information. Appointments and events are listed in a cell that can be called an "agenda" cell, a "timed events" cell, or simply an "events" cell. The above ranking is one example only. As discussed, this data is displayed in cells. Appointments and events listed may be created in other parts of the present invention or in other applications, known as "creator" applications.

According to embodiments of the present invention, appointment and to-do cells are dynamically sized. Today View efficiently takes advantage of as much screen display area as possible to convey important daily items. When Agenda has more items from the creator applications than can be displayed individually, it aggregates items based on priority. The overall strategy is to present these aggregation messages as a link to the respective creator view that can always appear in the same, persistent default setting and filtering state.

Messages, being the lowest in priority in some embodiments, can be aggregated and limited to just one display line. In many embodiments, the Today View is enabled to convey a count of messages that have been received and already read and those that have been received and are as yet unread. Embodiments are enabled to launch an email client application, revealing the messages, with a "tapping" on the touch screen or other selection of the message line text.

In some embodiments, the aggregation rule can next apply to tasks to accomplish, or "ToDo" items. If there is enough display area available, time-based ToDo items can be displayed as separate line items with the current day's due items on top of the list. 'Hidden' time based ToDo's can be aggregated as "Due Today," "Past Due," etc. The user can optionally select not to display the to-do cell and/or the messages cell.

Embodiments of the present invention employ five-way navigation usable in calendar viewing. Some embodiments are enabled to employ a "Tall Screen" display which allows an active input area of the touch screen display to be collapsed to present more display area in a rectangular format. Embodiments are also enabled to orient displayed information to a "landscape" format, where the long axis of the rectangular display is horizontal, or to a "portrait" format, where the long axis is vertical. Embodiments are also enabled to present user-selected background images in each of these display formats.

BRIEF DESCRIPTION OF THE DRAWINGS

The operation and components of this invention are described by reference to the drawings.

DETAILED DESCRIPTION

The following descriptions of specific embodiments of the present invention are presented for purposes of illustration and description. They are not intended to be exhaustive or to limit the invention to the precise forms disclosed, and obviously many modifications and variations are possible in light of the above teaching. The embodiments are chosen and described in order to best explain the principles of the invention and its practical application; to thereby enable others skilled in the art to best utilize the invention and various embodiments with various modifications as are suited to the particular use contemplated. It is intended that the scope of the invention be defined by the Claims appended hereto and their equivalents.

These descriptions of specific embodiments incorporate herein by reference, and claims priority to, the commonly-owned co-pending provisional patent application U.S. Ser. No. 60/467,794, entitled "MULTI-MODE CONFERENCE CALL SETUP AND MANAGEMENT AND DATA BROWSING USER INTERFACE TECHNIQUE ('MULLET DATEBOOK') AND DYNAMIC SIZING USER INTERFACE TECHNIQUE FOR DATA DISPLAY AND TEXT-KEY CUSTOMIZATION FOR AUDIO MENU SELECTION," filed May 1, 2003, and assigned to the assignee of the present invention.

In this discussion of some embodiments of the present invention, the terms, "handheld device," "cell phone," "portable electronic device" and "portable computing device" are used more or less interchangeably, as noted previously. In each case, they refer to a class of relatively small, user-portable, computing devices that are capable of performing the functions of portable computing devices and, importantly, accept user input in the form of pressure applied to, for instance, a touch-screen display/input device, through alphanumeric key input, or through a multi-directional navigation button, etc. Some of the above terms are also used to refer to devices that combine the functions of portable computing devices with those of wireless telephones.

It is noted here that specific names are used herein for many of the features presented in embodiments of the present invention. The names are used in this discussion only for example and illustration. Embodiments can be implemented with different names and can present different languages without limiting the functions and features found in these embodiments.

Figure 1A:
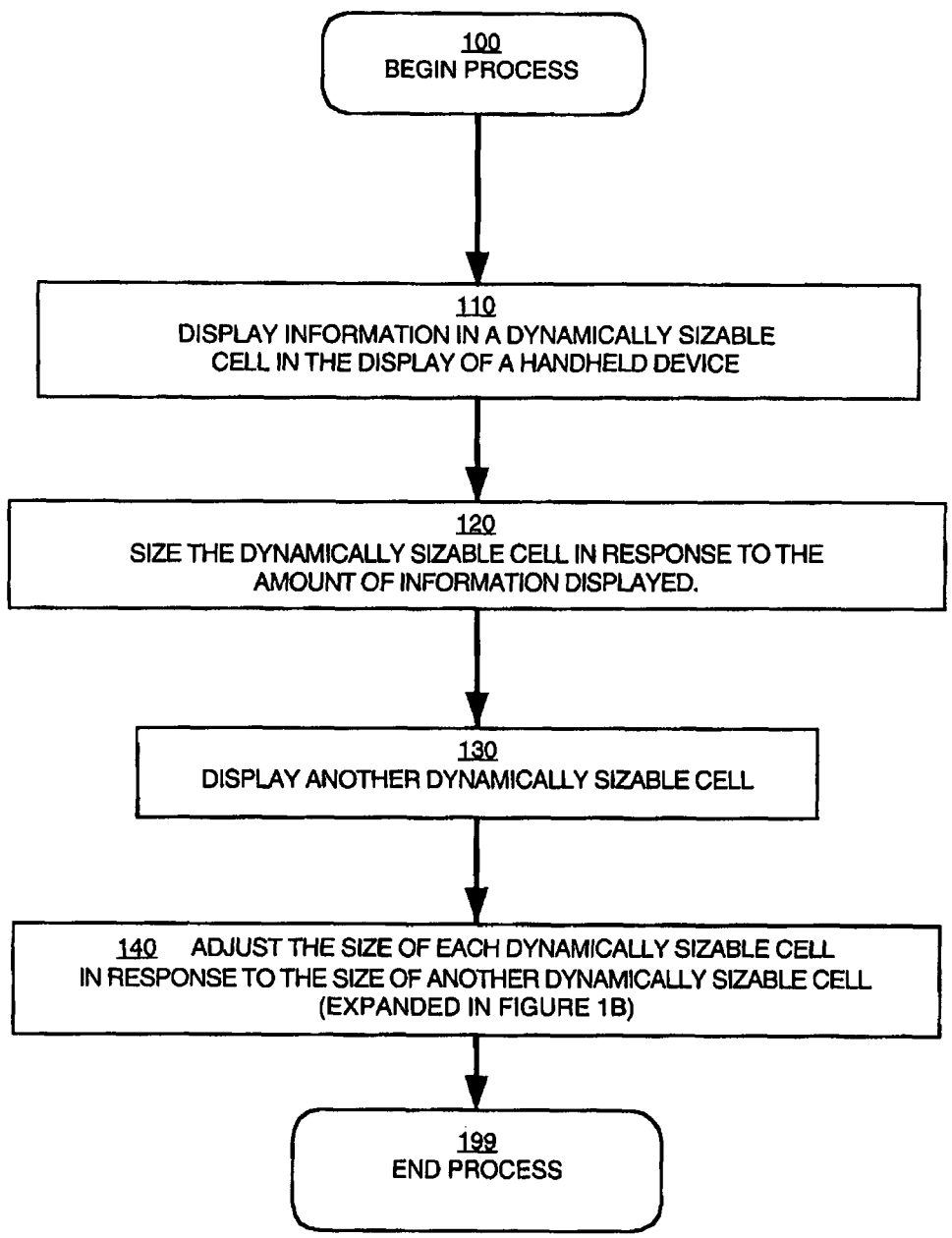
FIG. 1A illustrates, in block flow diagram, a computer implemented method for browsing, manipulating and viewing data consistent with embodiments of the present invention.

FIG. 1A illustrates, in block flow diagram form, a computer implemented method for displaying calendar information in a handheld device. There, process 100 begins by displaying information in the display of a handheld device 110. The information displayed can be any type of information but in this embodiment of the present invention it is envisioned as daily information, e.g., appointment and task information listed in text and graphical format in on-screen cells or windows that are dynamically sizable. Some embodiments are enabled to provide a graphic image as background or "wallpaper." Other embodiments of the present invention are enabled to provide graphic information in a number of dynamically sizable cells.

Process 100 continues by sizing the dynamically sizable cell in response to the amount of information contained in it at 120. The size of the cell, in this embodiment, expands or contracts as necessary to display the items listed in the type of information associated with the cell. An appointment cell for example, in this embodiment, shows all the listed appointments, or other events, that are scheduled, up to a certain limit. That limit can be settable by the user within a certain range. The upper limit is constrained so that there is always display area available to show a message line in the display and, if there are tasks, or "to-do," listed, a task list cell. The minimum limit for the appointment cell, also known as the "timed events" cell, is one appointment or a line informing the user that there are no appointments scheduled.

At 130, other dynamically sizable cells are displayed, e.g., the cell listing to-do items. Each cell is also sized according to the amount of information to be displayed. In this embodiment, a cell showing message information can also be displayed and may remain sized for one line of information.

The relative size of the timed events cell and the to-dos cell in this embodiment is dynamic. As shown at 140, the cells maximize and minimize interdependently, reflecting the number of items to be displayed at any one time and taking into consideration the number of active cells for display. The maximum extension of the two cells is flexible and relational, depending on the amount of left-over display area available. However, in case of conflict, there is a minimum number of rows defined for each cell. If the number of items to be displayed equals or exceeds this minimum, the cell will not contract.

For a square display, or a rectangular display with an uncollapsed active input area, the relational minimum cell size in this embodiment of the present invention is seven rows for events and two rows for to-do in one exemplary embodiment. For a rectangular display, also known as a "Tall App state," it is eleven rows for events and four rows for to-dos as one example. The sizes of the cells described herein are based on the screen size of the employing device. It is noted that other embodiments can have more or fewer allocated rows for information without altering the scope of the dynamically sizable cell embodiments herein described.

It is noted here that cells are also sized so that, if each cell has such a small list of items to display that the aggregate of items will not fill the available display area, each cell can expand to jointly take up the spare space. In other embodiments, each cell can shrink to a user-preferred minimum and the surplus display area can remain unused.

In one embodiment, the message display cell and the to-do display cell are optional and may be deactivated according to user configurations. If the to-do cell is suppressed, in one example, the events cell automatically may increase in size. Alternatively, if the messages cell is suppressed, then the to-do cell may increase in size. If both the to-do cell and messages cell are suppressed, then the event cell may increase in size automatically. If the to-do cell does not use all its area to display, the spare area may be used to automatically enlarge the events cell. In embodiments of the present invention, a cell is not enlarged, as described above, unless it contains information to display in the expanded area.

Figure 1B:
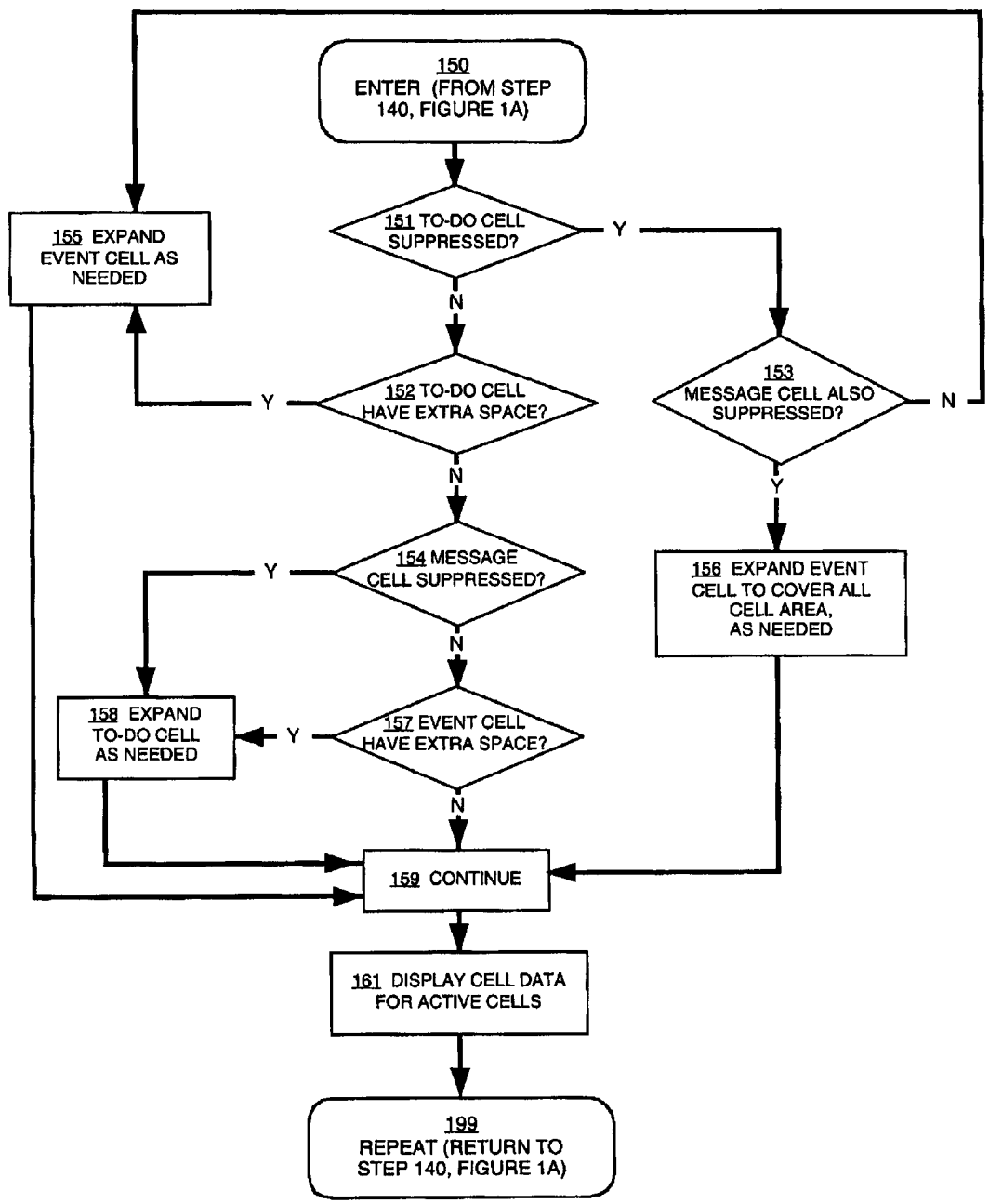
FIG. 1B illustrates, in block flow diagram, a computer implemented method for dynamically sizing cells in a display consistent with embodiments of the present invention.

FIG. 1B illustrates a method by which interrelational dynamic sizing is achieved in one embodiment of the present invention. In one embodiment, FIG. 1B may be viewed as an expansion of step 140 in FIG. 1. If the to-do cell is suppressed 151, and the message cell is not suppressed 153, then the event cell is expanded as needed 155 up to absorb the area made available by the to-do cell's suppression. If the to-do cell is suppressed 151, and the message cell is suppressed 153, then the events cell can expand to use up to all of the display area as needed 156.

If the to-do cell is not suppressed 151, and there is extra space available in the to-do cell 152, then, again, the event cell is expanded to take up available display area as needed 155. If, however, the to-do cell does not have extra space 152, and the message cell is suppressed 154, then the to-do cell is expanded to absorb the message cell's unused space as needed 158. If the message cell is not suppressed 154, but the event cell has extra area 157, then the to-do cell is again expanded as needed 158, this time absorbing display area remaining from the event cell. In each case, in this embodiment, the cells display the maximum amount of appropriate information that can be shown in the available area 161. When the information changes or when appropriateness of the information changes, such as when the scheduled time of an event passes, for example, then the process is repeated, 199. The process is also repeated when the user enters new information or when the user enters new preferences.

Figure 2A:
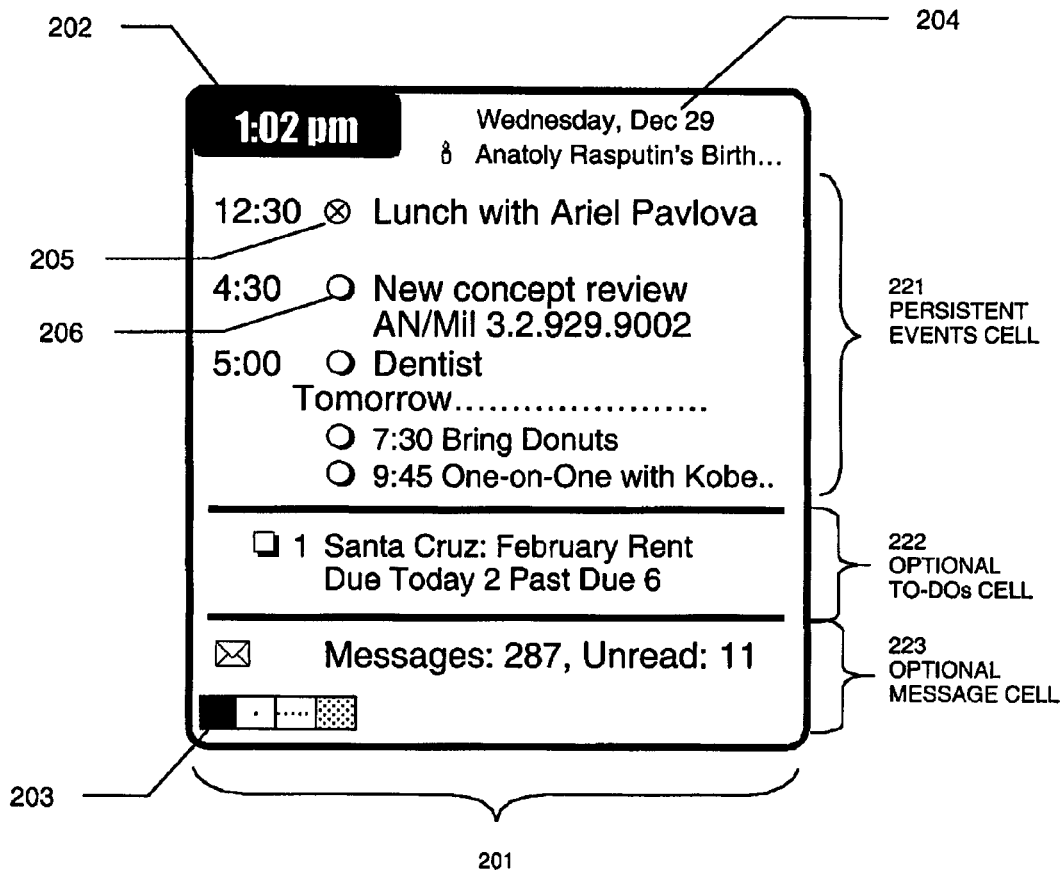
FIG. 2A illustrates an embodiment of dynamically sizable cells in a display in accordance with embodiments of the present invention.

FIG. 2A illustrates an embodiment of the present invention in which dynamically sizable cells are displayed on the screen of an electronic device. Exemplary square format display 201 comprises a clock display 202, date display 204, display select buttons 203, dynamically sizable events cell 221, dynamically sizable to-do cell 222, and message cell 223. In one embodiment, message cell 223 lists only one line of information. That line includes the total number of messages received and the number of those as yet unread. Other embodiments can enlarge the message cell information to include other information such as the title or sender of a high priority message, for example.

Dynamically sizable to-do cell 222 lists user-created tasks. The tasks, like the events listed in events cell 221, are created in "creator" applications, such as an electronic calendar or appointment book software application. Embodiments of the present invention are enabled to accept events and tasks from a variety of applications. The exemplary task shown in cell 222, in FIG. 2A, includes a due date and a past-due date. These time-constrained items can function, in this embodiment, as alarms.

Dynamically sizable events cell 221 is also shown. In addition to "today's" timed events, events upcoming soon are listed under "tomorrow." This embodiment of the present invention lists the time of the event and the name or other reference as well as a "past" icon 205 or an "upcoming" icon 206. In some embodiments, these icons change in accordance with the relation between the scheduled time and the clock time. In other embodiments, these icons can be changed by user input.

It is noted here that user input can be accepted in a number of ways in this embodiment. A user can touch the icon in the touch-screen display, in this example, with a stylus or other object. The user can also step through the icons and other screen entities using a five-way navigation button then change the icon status by using a select or other key. User input can also, in some embodiments, be accepted from an alpha-numeric keyboard.

Figure 2B:
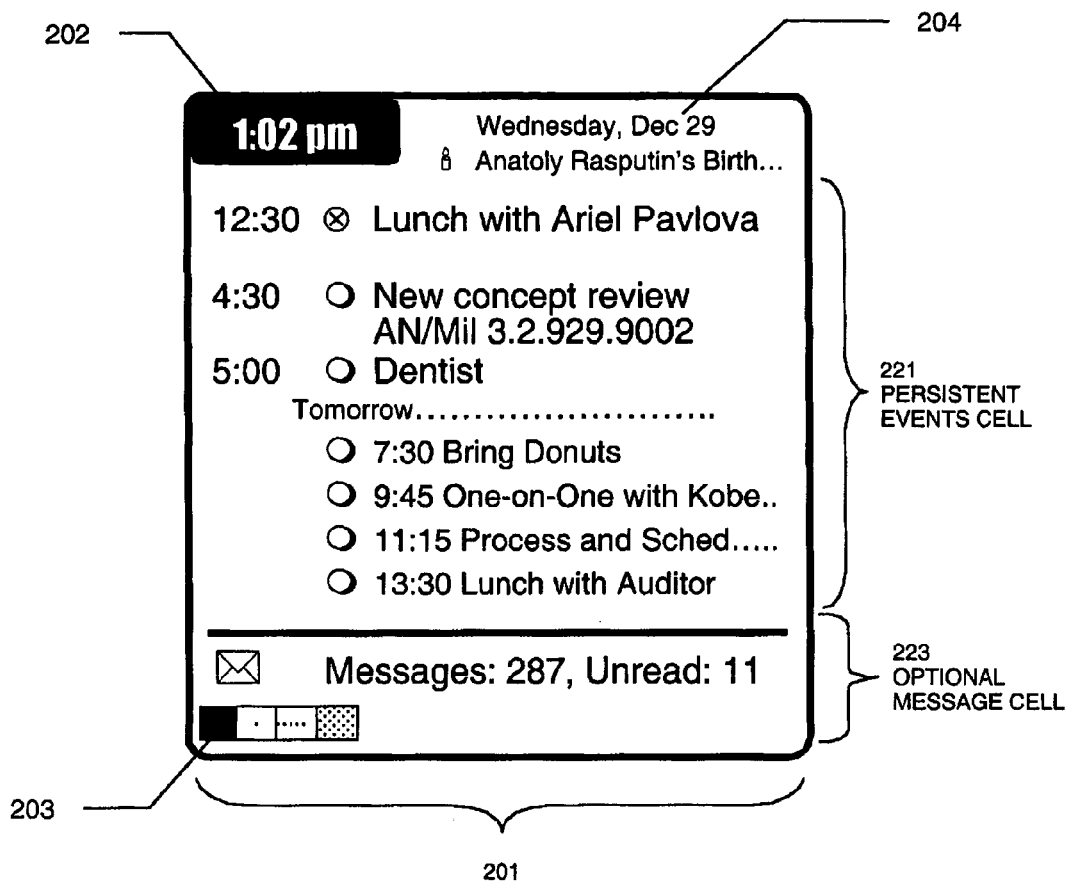
FIG. 2B illustrates interrelated sizing of dynamically sizable cells in a display in accordance with embodiments of the present invention.

The dynamic sizability of events cell 221 and to-do cell 222 are interdependent and their sizes also relate to the amount of information to be listed and to the number of active cells displayed. A user can, in this embodiment, select whether to display a cell or to suppress it entirely (e.g., deactivate it). FIG. 2B illustrates an embodiment of the present invention in which the to-do cell 222 is suppressed. Events cell 221, in this example, automatically expands to absorb the display area otherwise used by the to-do cell and events cell 221 is able to list more of its contained event listings. Message cell 223, in this example, remains at one message count line. Events cell 221 expands in size, in this example, only if it contains data to be displayed in the expanded area.

Figure 2C:
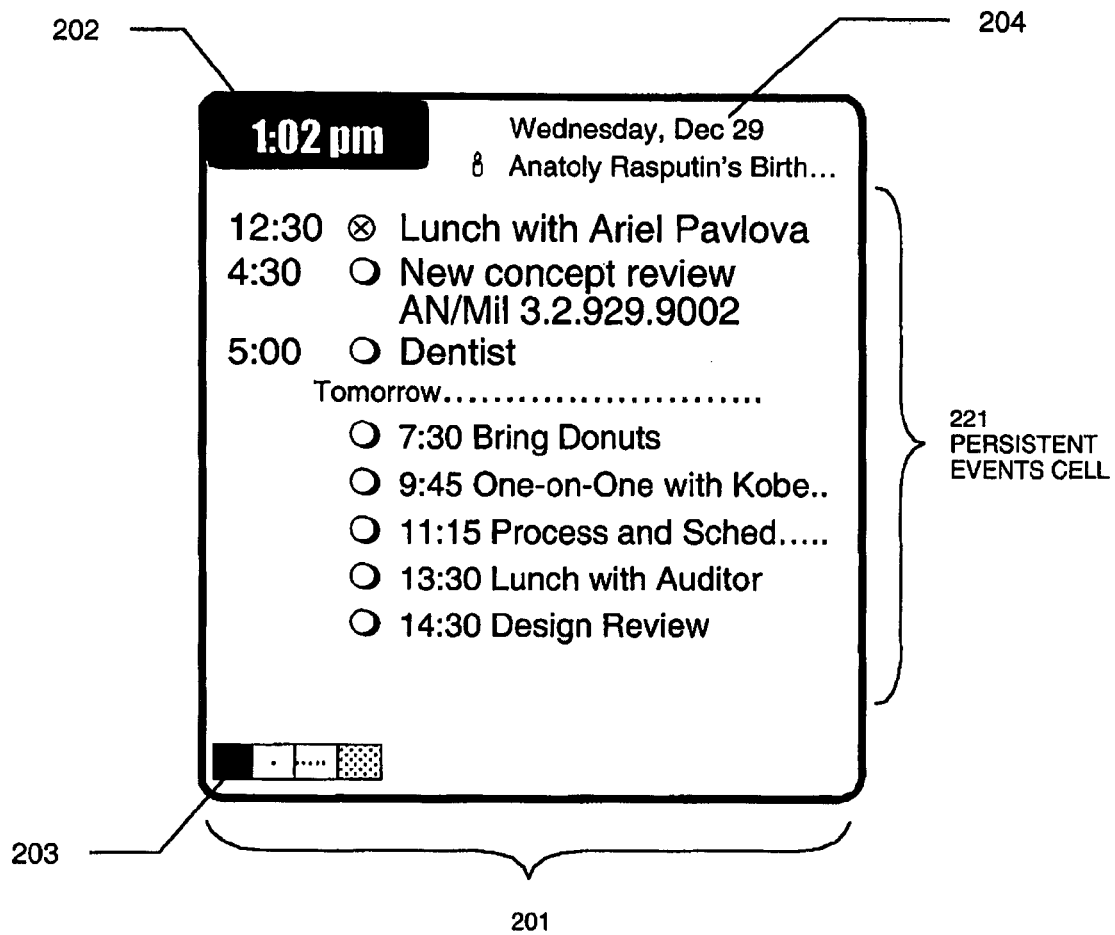
FIG. 2C illustrates another interrelated sizing of dynamically sizable cells in a display in accordance with embodiments of the present invention.

In FIG. 2C, message cell 223 has also been suppressed and events cell 221 expands to absorb all of the available display 201, assuming it contains data to be displayed in the expanded area. Clock 202 and view select buttons 203 are not absorbed in this example, however. When events cell 221 is able to absorb all available display 201 area, a large number of event items can be listed. In this example, three events are listed for the day shown and five for the following day, each with schedule times and icons. Other embodiments are enabled to list more.

Figure 2D:
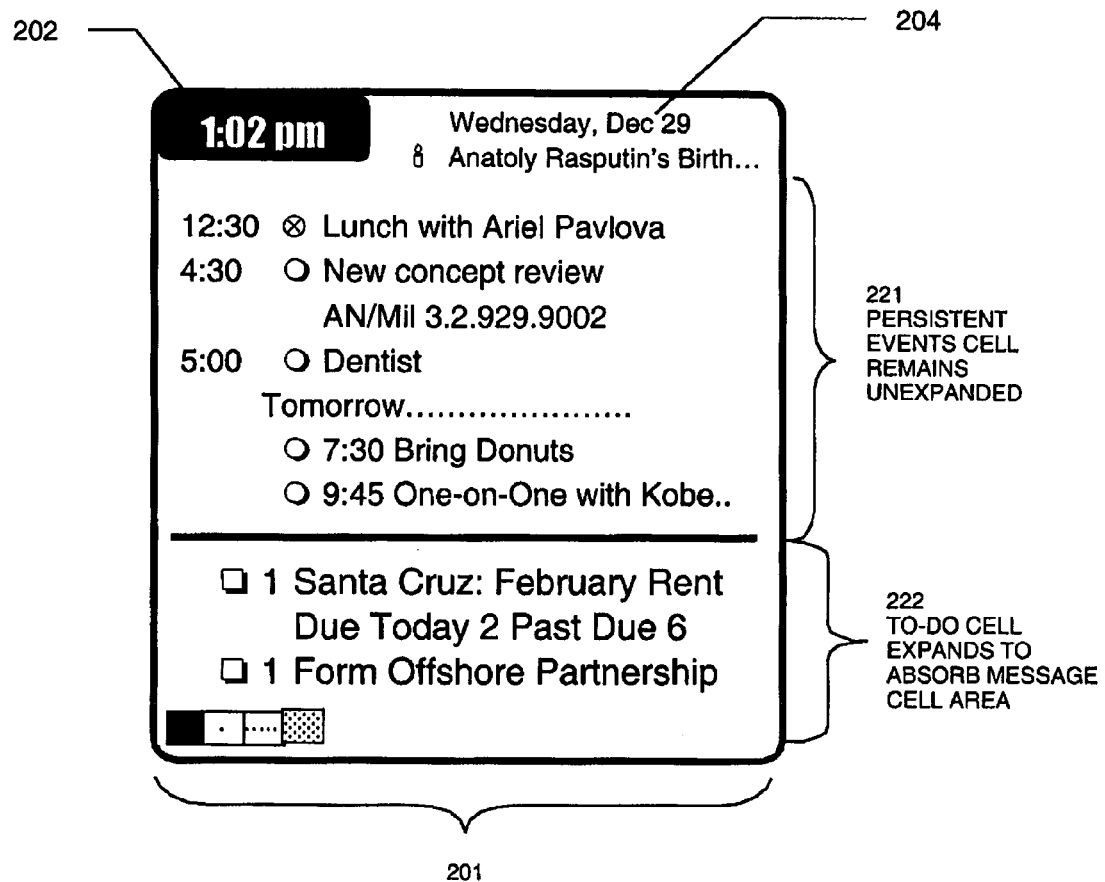
FIG. 2D illustrates another interrelated sizing of dynamically sizable cells in a display in accordance with embodiments of the present invention.

FIG. 2D illustrates a display in which message cell 223 has been suppressed and to-do cell 222 has expanded to take advantage of the now-available display area. In this embodiment of the present invention, the event cell 221 remains at its original size and the to-do cell 222 expands to absorb the area made available by suppression of the message cell 223.

Figure 2E:
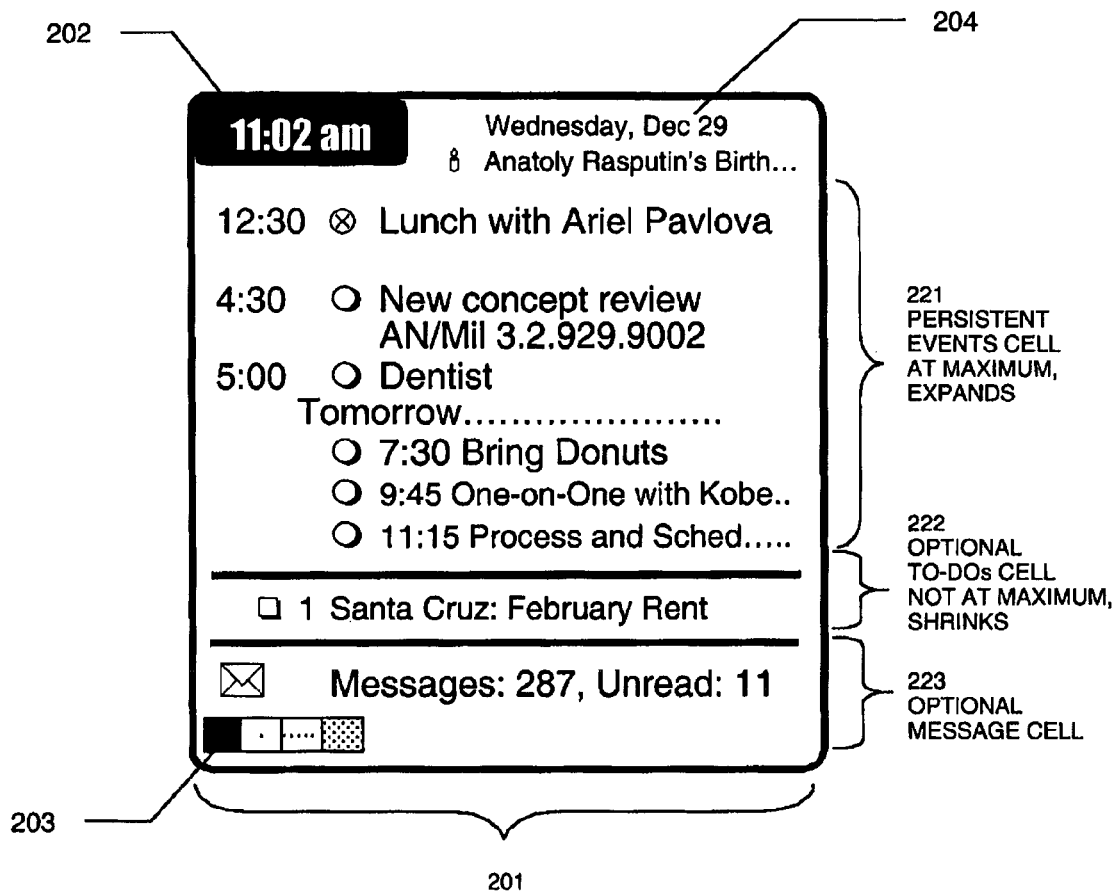
FIG. 2E illustrates another interrelated sizing of dynamically sizable cells in a display in accordance with embodiments of the present invention.

FIG. 2E illustrates the interrelational nature of dynamic sizing in these embodiments of the present invention. The layout of the timed events cell 221 and the to-do cell 222 is dynamic. The cells maximize and minimize interdependently, reflecting the number of items to be displayed at any given time and the active cells. The maximum extension of the two cells is flexible and relational and depends on how much left-over display area is available. However, in case of conflict there is a minimum number of rows defined for each cell which is user-selectable in this embodiment. Here, to-do cell 222 has automatically contracted one line to allow events cell 221 to list another upcoming event because cell 221 needed more area and cell 222 did not need the area.

In the example shown, the relational minimum size of the two dynamic cells defines the number of rows composing the two cells, if the number of items to be displayed equals or exceeds the user-defined minimum for both cells. It is noted that this occurrence has a higher probability in an embodiment employing a square aspect display. If the relational minimum size of one dynamic cell exceeds the number of items to be displayed, it will automatically contract and cede display area to the other cell. For to-do cell 221 on a square aspect display, this amount that can be ceded is only one row in this embodiment. The timed events is then enabled to display one more (single row) item. It is noted that other embodiments are enabled to expand and contract over more items, depending on the total screen size available.

Figure 2F:
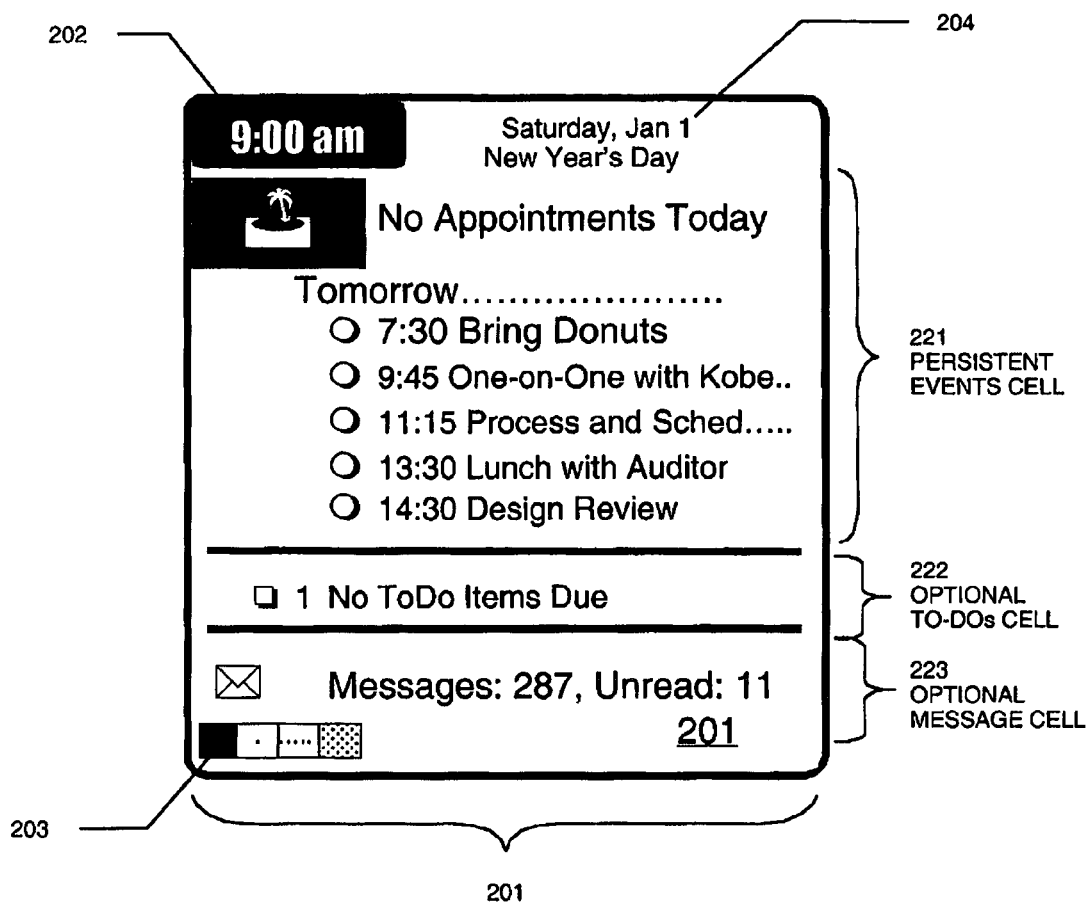
FIG. 2F illustrates an interrelated sizing of dynamically sizable cells in which cells have no listed information in a display in accordance with embodiments of the present invention.

FIG. 2F illustrates the display of an embodiment of the present invention when there is no content for a cell to display or no content of a particular type. If there is no content for an active cell, it does not fully collapse but rather displays a corresponding message and the other cell can absorb the remaining display up to the minimum reserved size of the no-content cell. Here, there are no events scheduled for "today" and the one-line message reads "No Appointments Today." However the "tomorrow" portion of events cell 221 has content and that content is displayed as normal. To-do cell 222 also has no content and displays only the one line message "No ToDo Items Due." It is noted here that these messages can vary in various embodiments. The specific wording used in this embodiment is only used here for illustrative purposes.

Figure 2G:
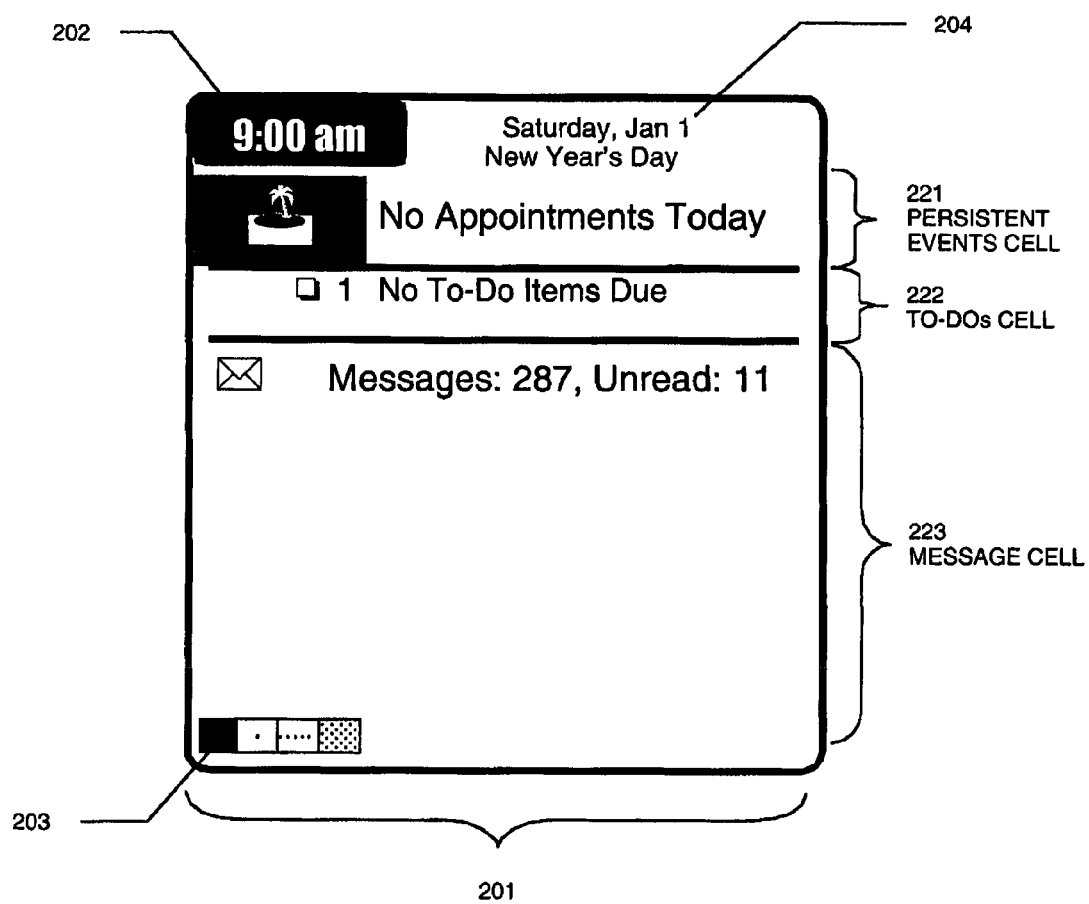
FIG. 2G illustrates another interrelated sizing of dynamically sizable cells in which cells have no listed information in a display in accordance with embodiments of the present invention.

As shown in FIG. 2G, if both cells are devoid of information to be listed, both shrink to their relational minimums. The remaining display area remains blank, in this embodiment of the present invention.

Figure 2H:
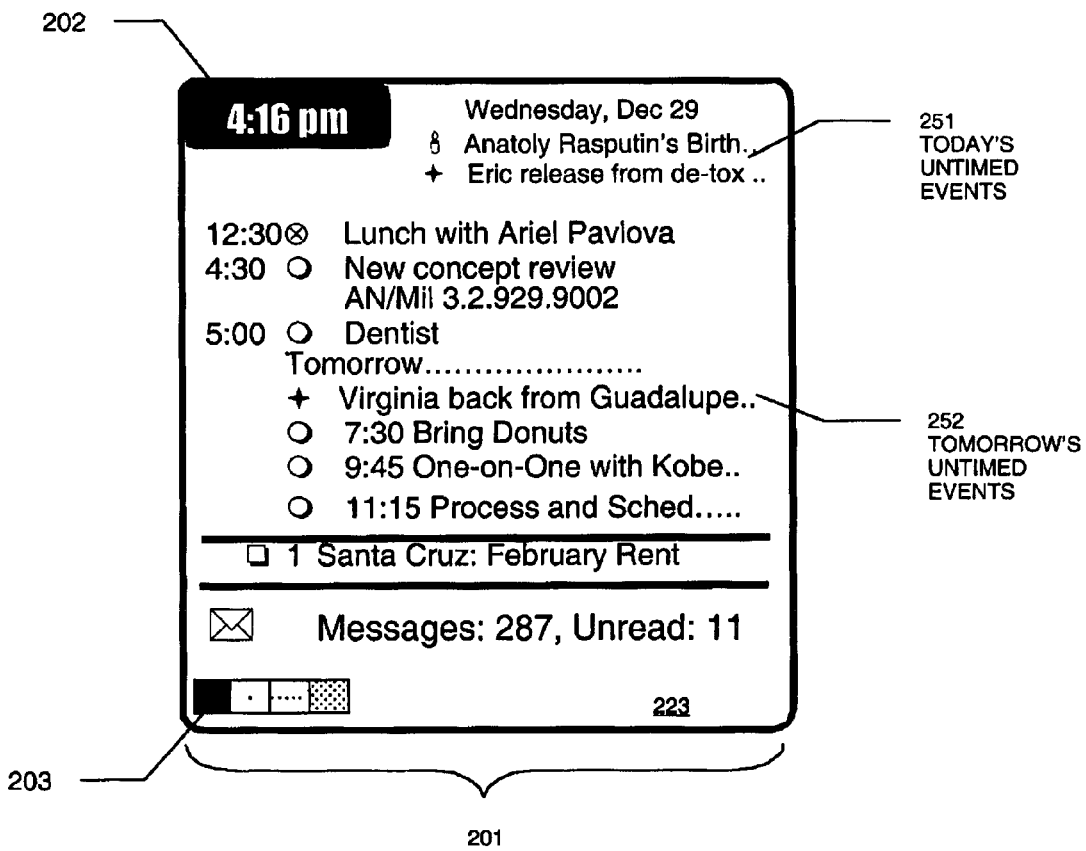
FIG. 2H illustrates another interrelated sizing of dynamically sizable cells in which cells have no listed information in a display in accordance with embodiments of the present invention.

It is noted that there are both timed and untimed events that can be scheduled in this embodiment of the present invention. FIG. 2H illustrates both timed and untimed events listed in events cell 221. The untimed events for today are listed, in this example, at 251, shown just below the date line. Tomorrow's untimed events are listed at 252, in the upcoming events section of events cell 221, in this embodiment. Untimed events in this embodiment also are denoted with an icon that is different from those of timed events and lack a start time indication. In this embodiment, with future days' untimed events being listed above timed events, a sufficient number of untimed events can displace timed future events to outside the events cell's available listing space and scrolling is required to view those timed future events. In other embodiments, however, untimed events may be listed beneath timed events.

Timed events, in this embodiment of the present invention, are shown in the events cell and scroll through the cell as time passes. Over time, timed events migrate to the top and, if there are no more hidden events for today, the timed events make room for future events in other days.

Today's events show the event title in bold font in this embodiment of the present invention, running over one line. If the event has a location field attached, the location field is shown on a second line.

Future events, though shown only as "tomorrow" in these illustrations, also include all other future days. If there is sufficient space available, future day's events are listed under the headings for the applicable days.

The display illustrated in this embodiment of the present invention enables the user to select a number of preferred settings for the display's presentation. The aforementioned minimum size for cells is one set of many selectable settings.

Figure 3A:
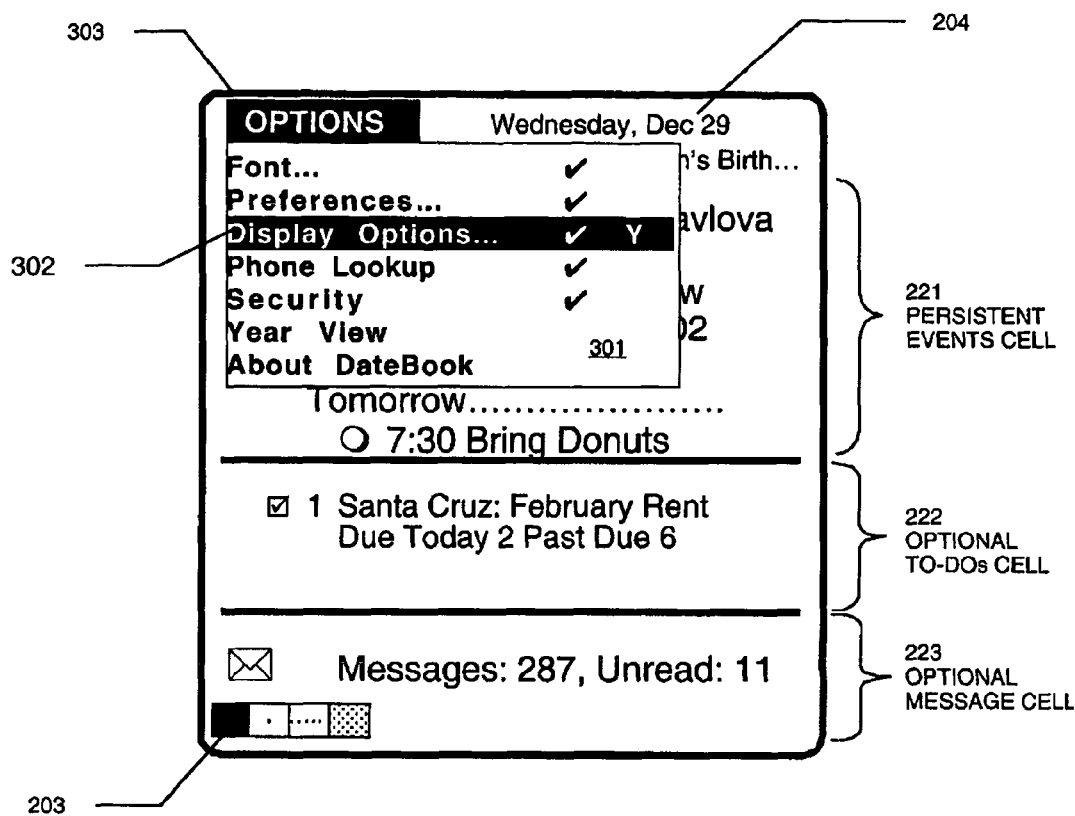
FIG. 3A illustrates a display options window in accordance with an embodiment of the present invention.
Figure 3B:
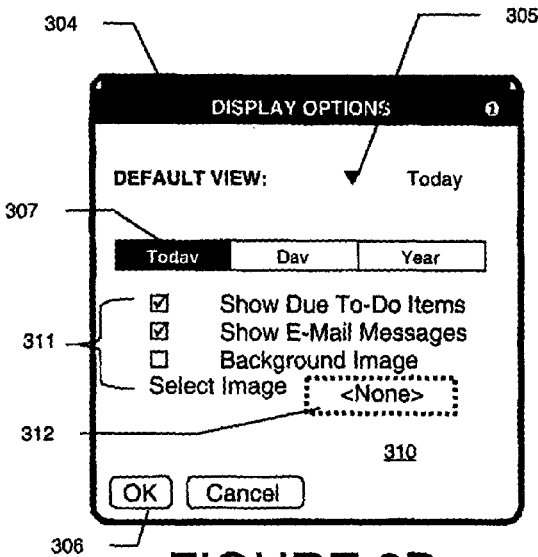
FIGS. 3B, 3C, 3D and 3E illustrate selecting a background image in a display of a handheld computing device in accordance with an embodiment of the present invention.

FIG. 3A illustrates the options pull-down menu employed in one embodiment of the present invention. "Display Options" is shown selected at 302. Upon selection of display options, the display changes to that shown in FIG. 3B. Here, display options window 310 is characterized by a title bar 304, view select button 305, view indicators 307, and window closing buttons 306 which are, in this example, "OK," signifying acceptance of settings changes, and "Cancel," signifying rejection of any entered settings changes. Display 310 also shows cell select buttons 311 and selected image window 312. It is noted that in this embodiment of the present invention, an image can be selected from a group of images and used as background to many of the displays. The group of images can be assorted stock images or user created images or photographs. The Select Image display appears when the "Background Image" icon box is selected.

Figure 3C:
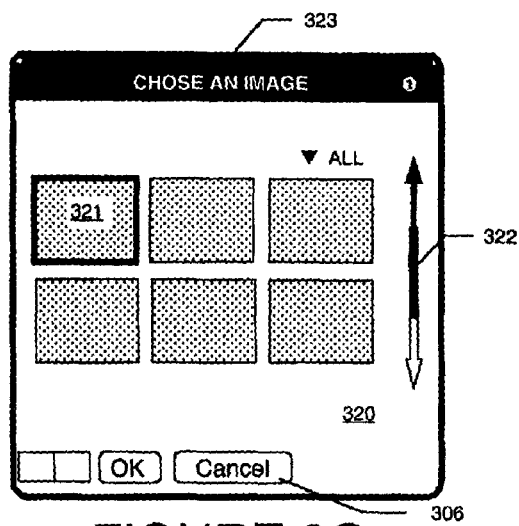

FIG. 3C illustrates selecting a background image in the select image display. Here, title bar 323 is labeled "choose an image" but some embodiments may use other phrasing. In this embodiment of the present invention, a selection of thumbnail images is presented for user selection at 321. If there are more thumbnail images than can be presented at one time, the remaining images can be viewed by either stepping down by use of a navigation button or by stroking scroll arrow 322 with a stylus in the touch-screen display.

Figure 3D:
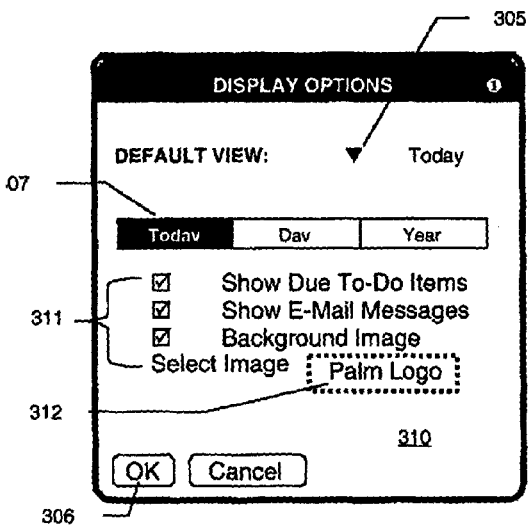
Figure 3E:
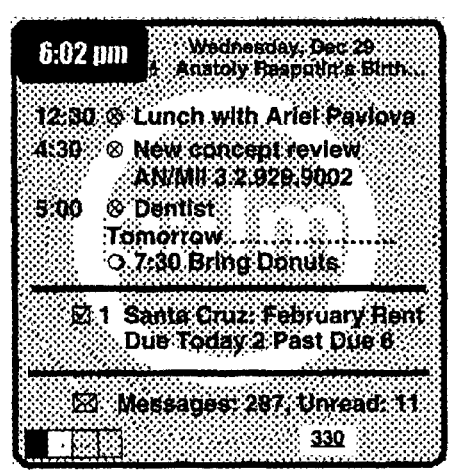
Figure 3F:
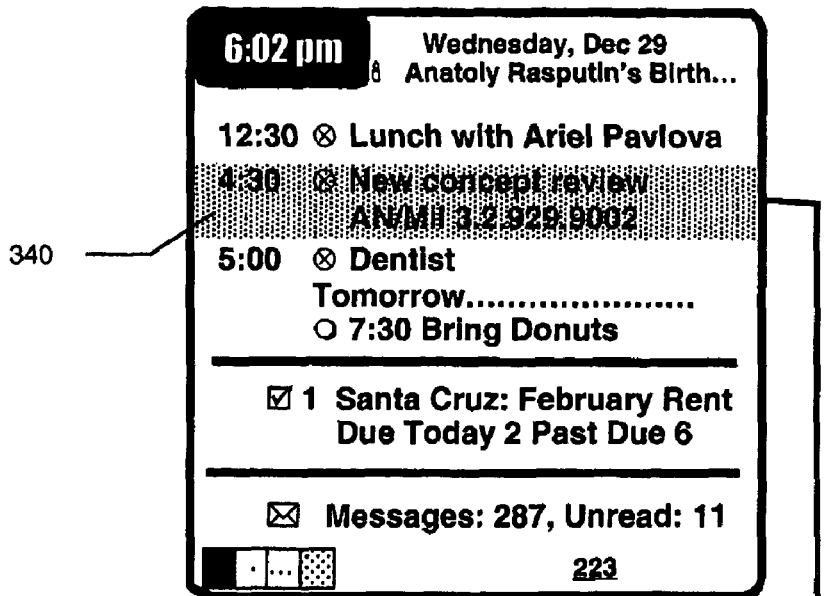
FIGS. 3F and 3G illustrate creating and editing a timed event in accordance with an embodiment of the present invention.

When an image is selected, its name appears in window 312 as shown in FIG. 3D and, in the embodiment, display 310 re-appears showing the selected image name. When "OK" is selected, the display returns to the today view display, 330, with the selected image in the background. In this embodiment, the information listed in the dynamically sizable cells is not affected by the presence of a background image.

3E, 3F

Figure 3G:
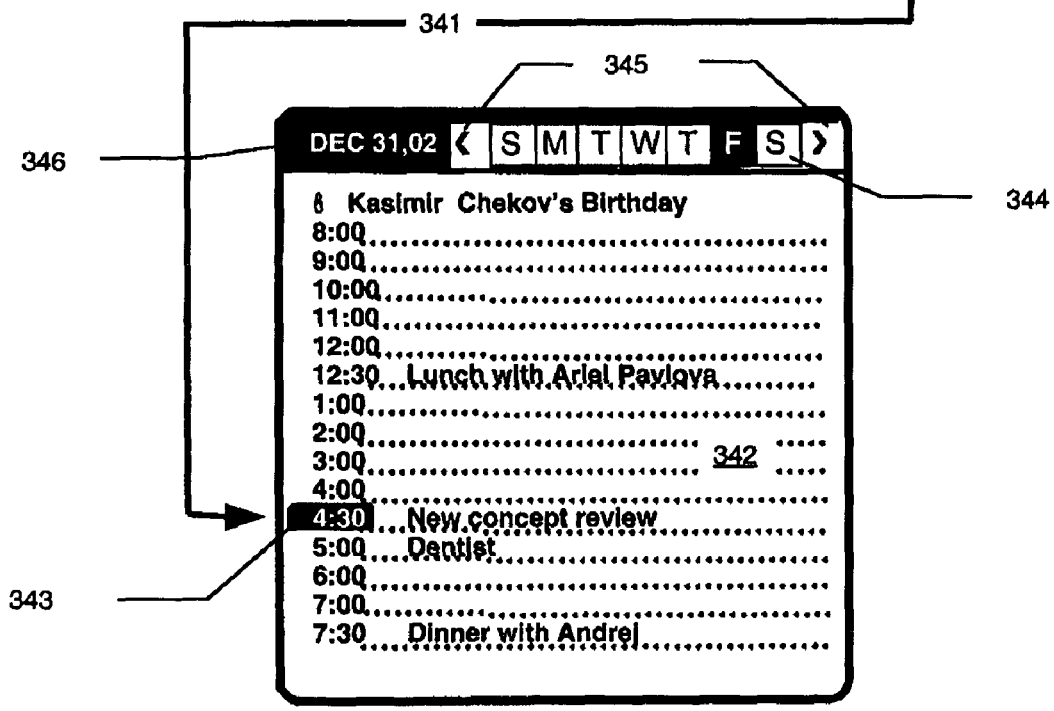

FIG. 3G illustrates accessing a creator application in order to modify a timed event. Here, an upcoming timed event is highlighted 341 in display 223. Highlighting and selecting, in this embodiment, causes the appearance 341 of day view display 342. The selected timed event is denoted on the day view display as a highlighted time indicator 343. In this embodiment, another selection, of the highlighted time indicator, allows further editing of the timed event. It is noted that the exemplary timed event in FIG. 3G has a start time of "4:30." In the day view time listing, however, only times on the hour are listed. An "off-hour" time is only listed when an off-hour time has been selected as a start time for the timed event. FIG. 3G is also, in this embodiment, characterized by a date window 346 and a day of the week indicator button set 344. Days of the week can be selected forward or backward in time by selecting arrows 345.

Figure 4A:
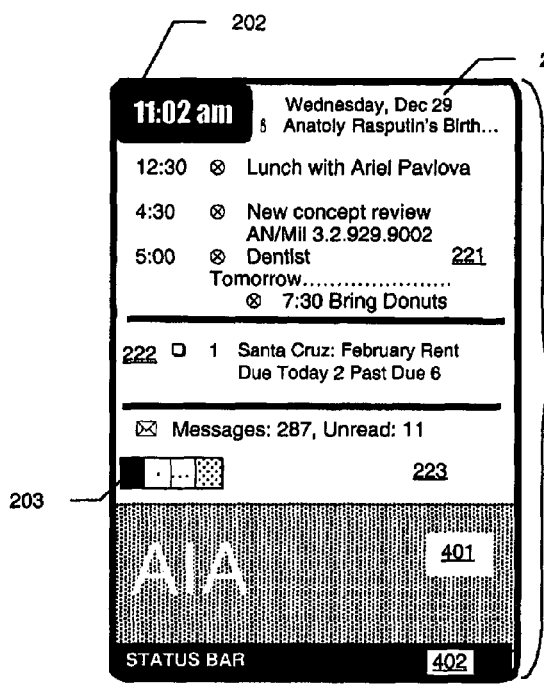
FIGS. 4A and 4B illustrate a rectangular display in portrait mode with a collapsible active input area in accordance with an embodiment of the present invention.
Figure 4B:
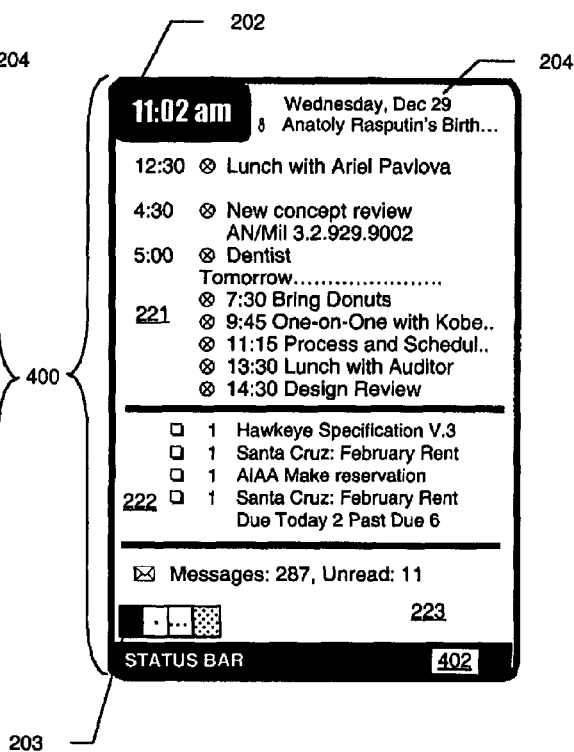

Embodiments of the present invention can also be implemented in a rectangular display format as shown in display 400 in FIG. 4A and FIG. 4B. A rectangular display 400 can be called a "Tallscreen" display or a "Tall App State" in some embodiments. It is noted that display 400 is presented in a portrait orientation, with the vertical axis of the display aligned with the long axis of the touch-screen display. As shown in FIG. 4A, there is an active input area (AIA) 401 for user alpha-numeric input in the touch-screen display. The square area above the active input area is treated in the same manner as a square format display with events cell 221, to-do cell 222 and message cell 223 shown in their square display relative sizes. Also present in display 400 are status bar 402, clock display 202 and view select buttons 203.

The active input area can be collapsed, or minimized, as shown in FIG. 4B, making its display area available to the dynamically sizable cells. When the display area is available, events cell 221 and to-do cell 222 each enlarge to take advantage of the increased area. It is noted that, in the default relationship in this embodiment of the present invention, an extra nine to eleven rows become available to event cell 221 and four rows become available to to-do cell 222 upon active input area collapse. Navigation in the listed information presented in a tallscreen display is in the same manner as in a square screen display.

Figure 4C:
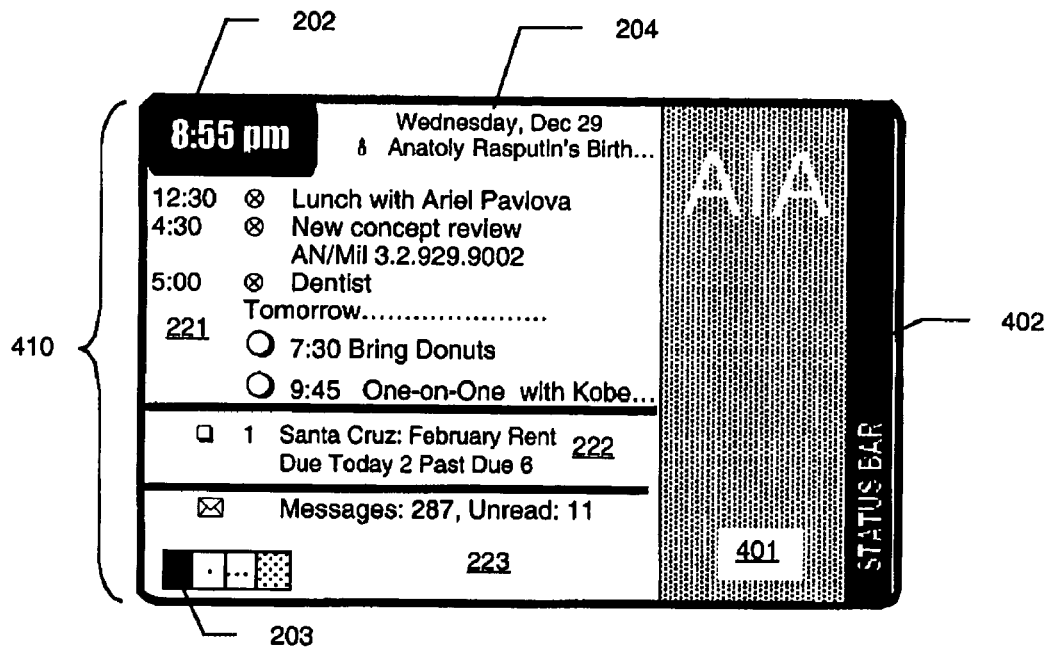
FIGS. 4C and 4D illustrate a rectangular display in landscape mode with a collapsible active input area in accordance with an embodiment of the present invention.
Figure 4D:
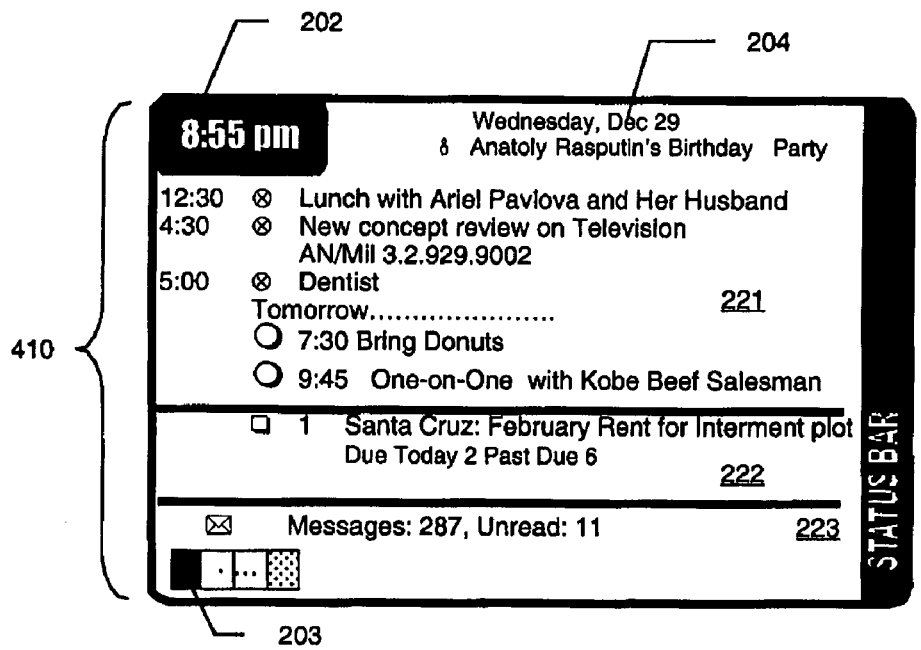

A tallscreen display can be presented in a landscape orientation as shown in FIG. 4C and FIG. 4D. Here the vertical axis of display 410 is oriented with the short axis of the rectangular touch-screen. When the active input area is maximized, is presented, in this embodiment, on the right side of the display. It is noted here that some embodiments are enabled to present the active input area on the left side of the screen when in landscape mode. Again, when the active input area is maximized, the dynamically sizable cells are presented in a default square aspect display, as shown in FIG. 4C.

FIG. 4D illustrates the behavior of display 410 when the active input area is collapsed. Unlike the increase in available rows that occurs in portrait mode, event cell 221, to-do cell 222 and message cell 223 increase in width to take advantage of the increased available display area. While no increase occurs in listed items, increased area is available more information as shown. It is noted that the status bar 402 in this embodiment occupies the end of the rectangular display, not having changed from its location in portrait mode. The clock 202 and view select buttons move, however, to remain in their respective locations in the display 410.

Figure 4E:
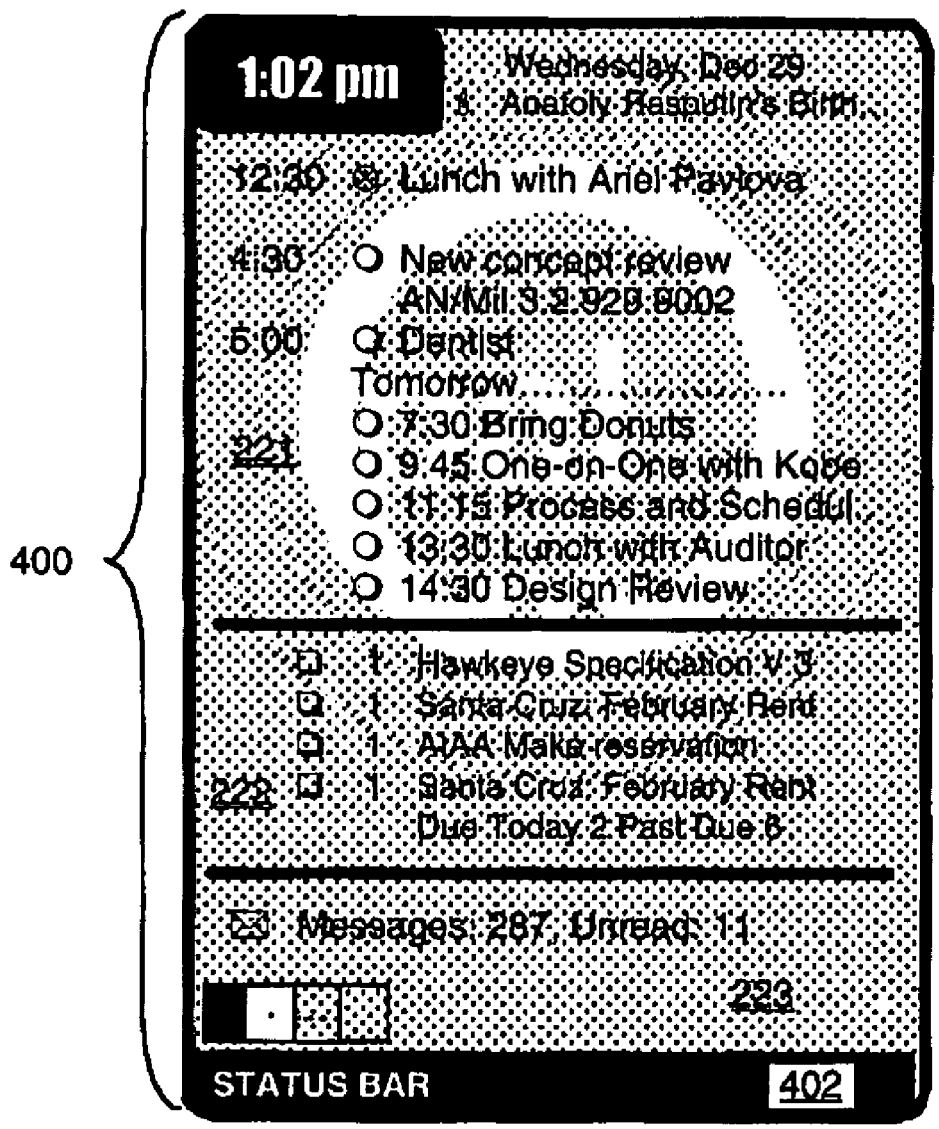
FIG. 4E illustrates a rectangular display in portrait mode with a background image in accordance with an embodiment of the present invention.

FIG. 4E illustrates the behavior of a background image in tallscreen portrait mode when the active input area is minimized. In this embodiment, the image retains its size and orientation. If the stored image is larger than the presented image, then more of the stored image is presented. If the stored image and the presented image are of the same size, the presented image remains and a blank background is presented in the increased area.

Figure 5:
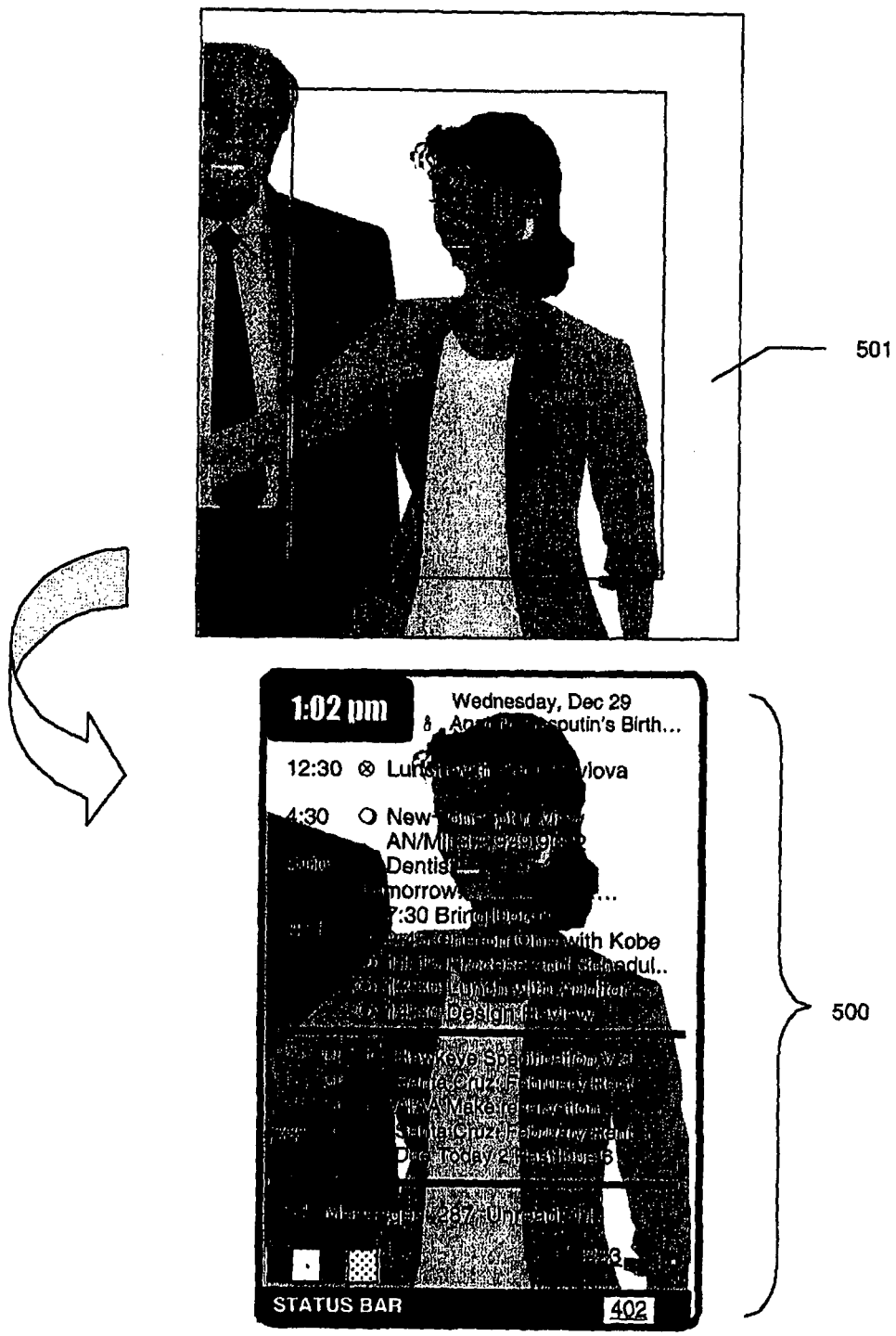
FIG. 5 illustrates sizing a background image in a rectangular display in portrait mode in accordance with an embodiment of the present invention.

FIG. 5 illustrates sizing a stored image to be presented as a background image in the tallscreen display, in portrait mode. Image 501 is larger than the area 502 that can be presented in the tallscreen display, 500. In this embodiment of the present invention, the presented image is taken from the center of the stored image with an equal amount of cropping occurring on the left and right sides and on the top and bottom. In other embodiments, the user can select a portion of a stored image to present as a background.

Figure 6:
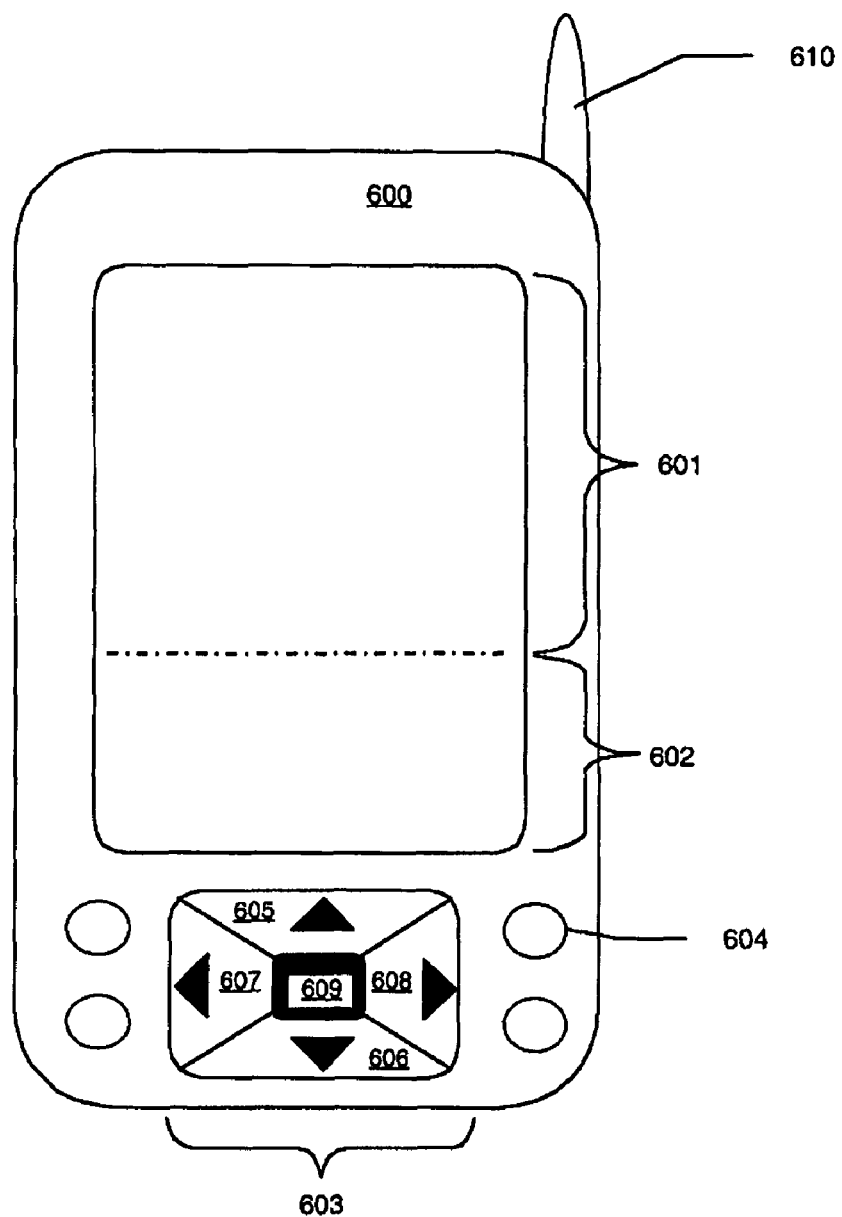
FIG. 6 illustrates an exemplary physical embodiment of a portable computer system in accordance with one embodiment of the present invention.

FIG. 6 illustrates a portable electronic device in accordance with an embodiment of the present invention. In this illustration, the portable electronic device is implemented as a handheld computing device 600. Device 600 is enabled with a touch-screen display 601 and an active input area (AIA) 602.

Device 600 is also implemented with application buttons 604 and five-way navigation buttons 603. The five-way navigation buttons shown at 603 comprise "up" button 605, "down" button 606, "left" button 607, "right" button 608 and "pick" button 609. "Pick" button 609 can also be known as a "select" button.

It is noted that the presence, use, and position of application buttons 604 may vary in different implementations without limiting effect on embodiments of the present invention. Device 600 is also equipped with a stylus 610 which allows a user to easily input to the device via the pressure sensitive membrane or digitizer of the touch-screen display, 601.

Embodiments may employ variations of touch-screen display 601. The implementation illustrated is a "tall screen" device, meaning that it is enabled to present more information than a substantially square screen device in that it is enabled to use active input area (AIA) 602 as an extension of the normal, square, display area. A tall screen device can also be known, when expanded, as a "Tall App State" device. It is noted that the presence, use, and position of application buttons 604 may vary in different implementations without limiting effect on embodiments of the present invention.

Figure 7A:
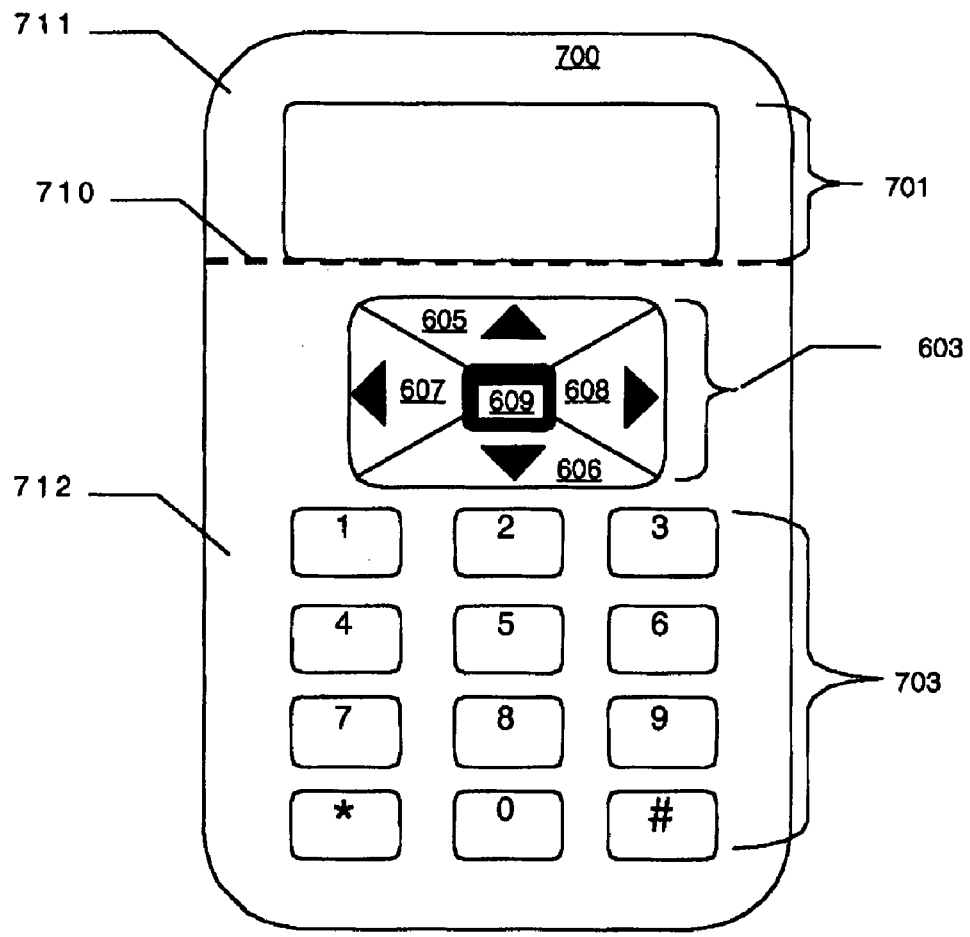
FIG. 7A illustrates an exemplary physical embodiment of a portable computer system in accordance with one embodiment of the present invention.

FIG. 7A illustrates another portable electronic device in accordance with an embodiment of the present invention. In this illustration, the portable electronic device is implemented as a handheld computer, 700, enabled with wireless phone capabilities. Device 700 is enabled with a touch-screen display 701.

It is noted that the particular device 700 illustrated is implemented in a folding or telescoping form factor. In this illustration, line 710 illustrates a dividing line between upper body portion 711 and lower body portion 712 which is shown slid over touch-screen display 701, thus showing only the uppermost portion of the display. The form factor shown is only an example of implementations available in embodiments of the present invention and is not meant to limit embodiments to any particular form factor.

Portable electronic device 700 is enabled with a numeric keypad 703 which comprises, in this implementation, numeric keys 0-9 as well as "star" and "pound" keys. The exemplary keypad shown is only for illustration and is not meant to limit alpha-numeric input devices any particular form in embodiments of the present invention.

Portable electronic device 700 is also enabled with a five-way navigation button, 603. The five-way navigation button comprises "up" button 605, "down" button 606, "left" button 607, "right" button 608 and "pick," or "select," button 609.

Figure 7B:
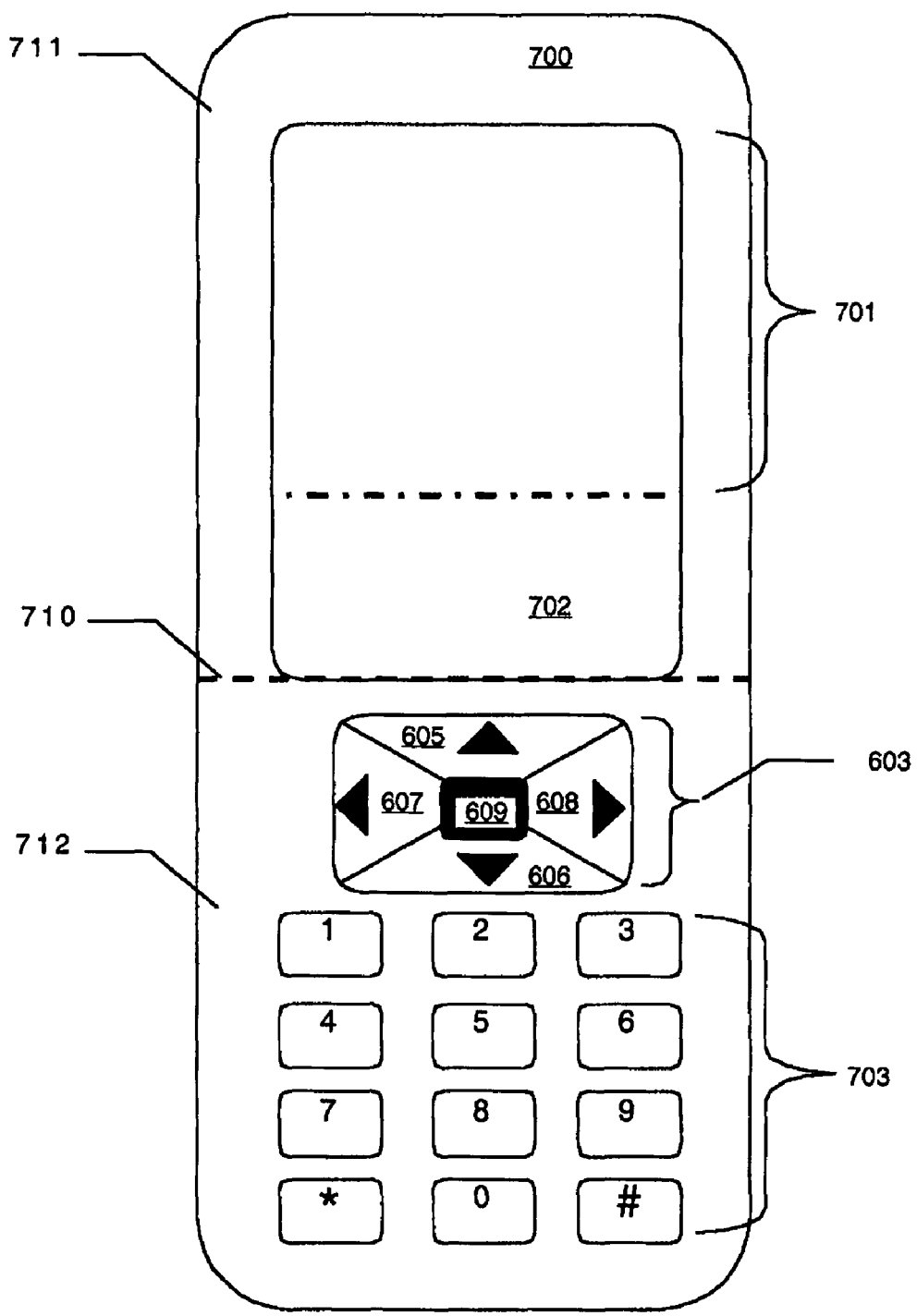
FIG. 7B illustrates an exemplary physical embodiment of a portable computer system in accordance with another embodiment of the present invention with an extended screen mode.

FIG. 7B illustrates portable electronic device 700 in an open position, with lower portion 712 retracted and exposing the full expanse of rectangular touch-screen display 301. In the display's exposed position, active input area 702 is shown.

Figure 7C:
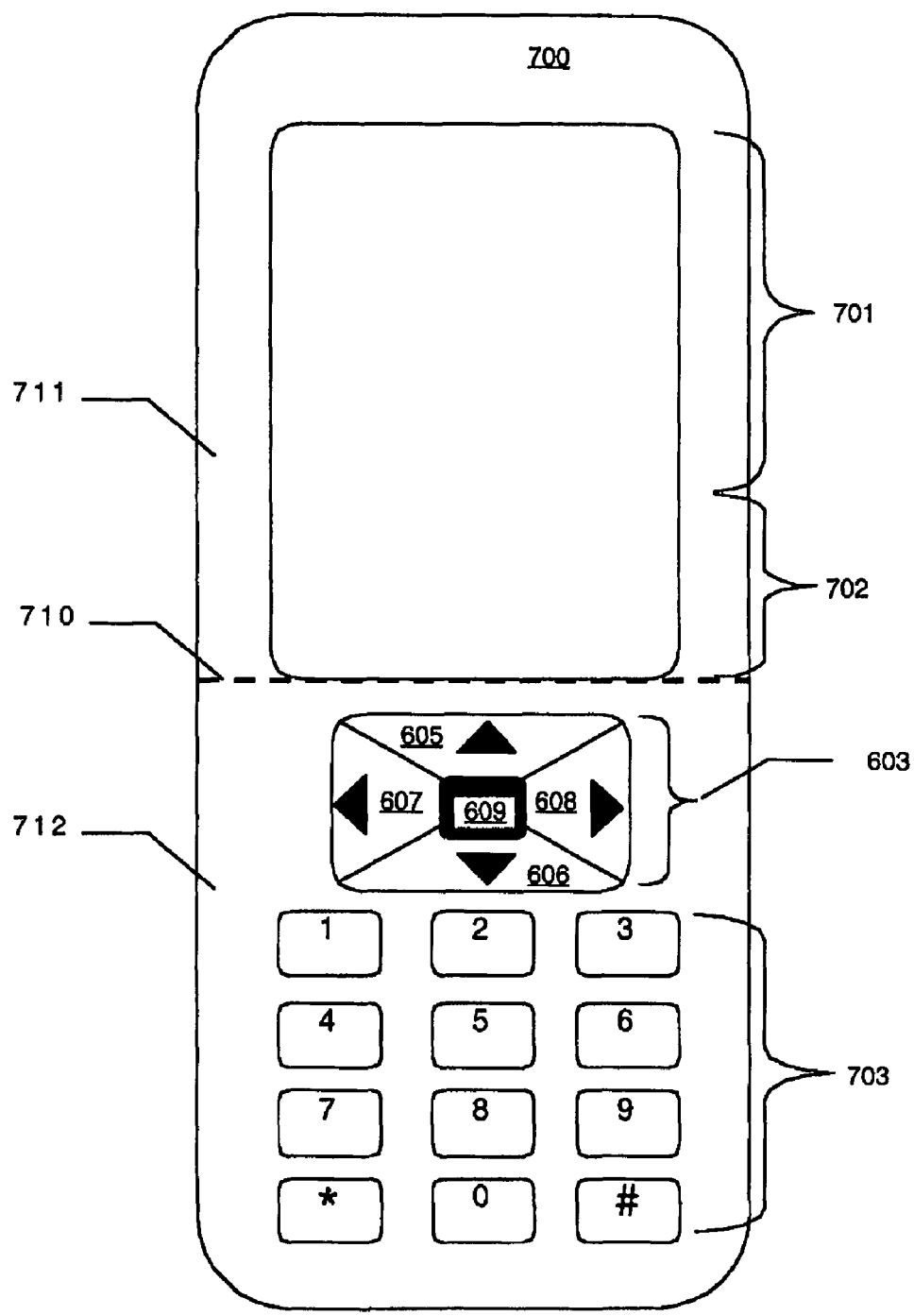
FIG. 7C illustrates a physical embodiment of a portable computer system in accordance with one embodiment of the present invention with an extended screen mode and a graphical user interface.

As discussed previously, embodiments of the present invention are enabled with an active input area, 702, that can be "collapsed." Collapsing the active input area allows the effective display area to expand, making use of the active input area when not needed for input. FIG. 7C illustrates portable electronic device 700 with active input area 702 collapsed to allow a graphical user interface display to be shown in the full expanse of the display area.

Figure 8:
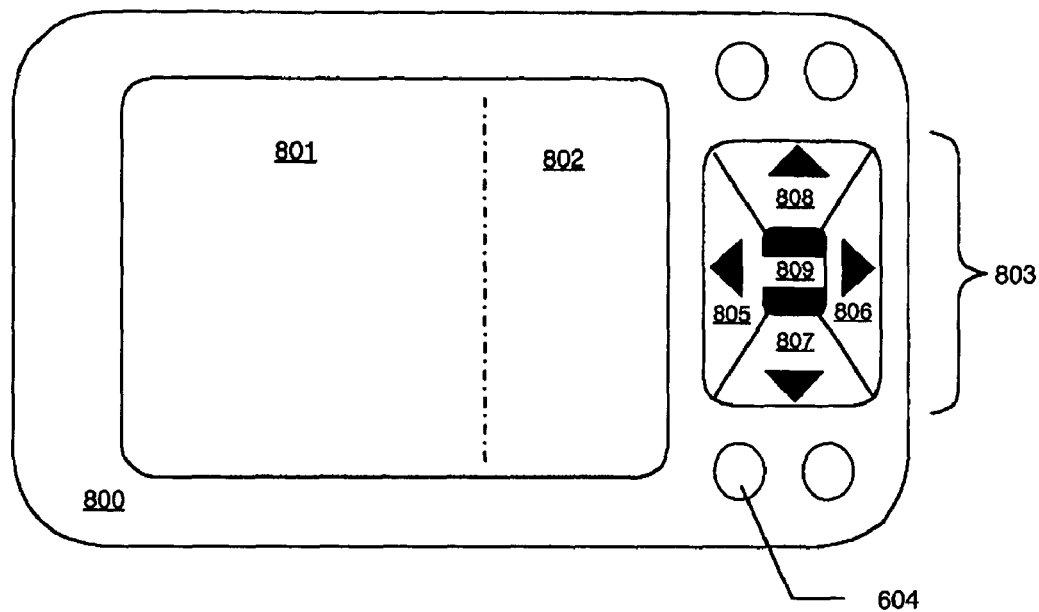
FIG. 8 illustrates a physical embodiment of a portable computer system in accordance with one embodiment of the present invention presented in landscape mode.

FIG. 8 is an illustration of a handheld computing in which embodiments of the present invention can be presented in a landscape mode. Device 800 presents touch-screen display 801, which includes collapsible active input area 802. Also included are application buttons 604 whose functions are the same as previously illustrated handheld devices. Five-way navigation buttons 803 are located in the same physical place in the device as when the display is presented in portrait mode. However, the functions of the individual navigation buttons change so that the user is able to keep the same user friendly orientation of up button 808, down button 807, left button 805 and right button 806, and their associated cursor movements.

Figure 9:
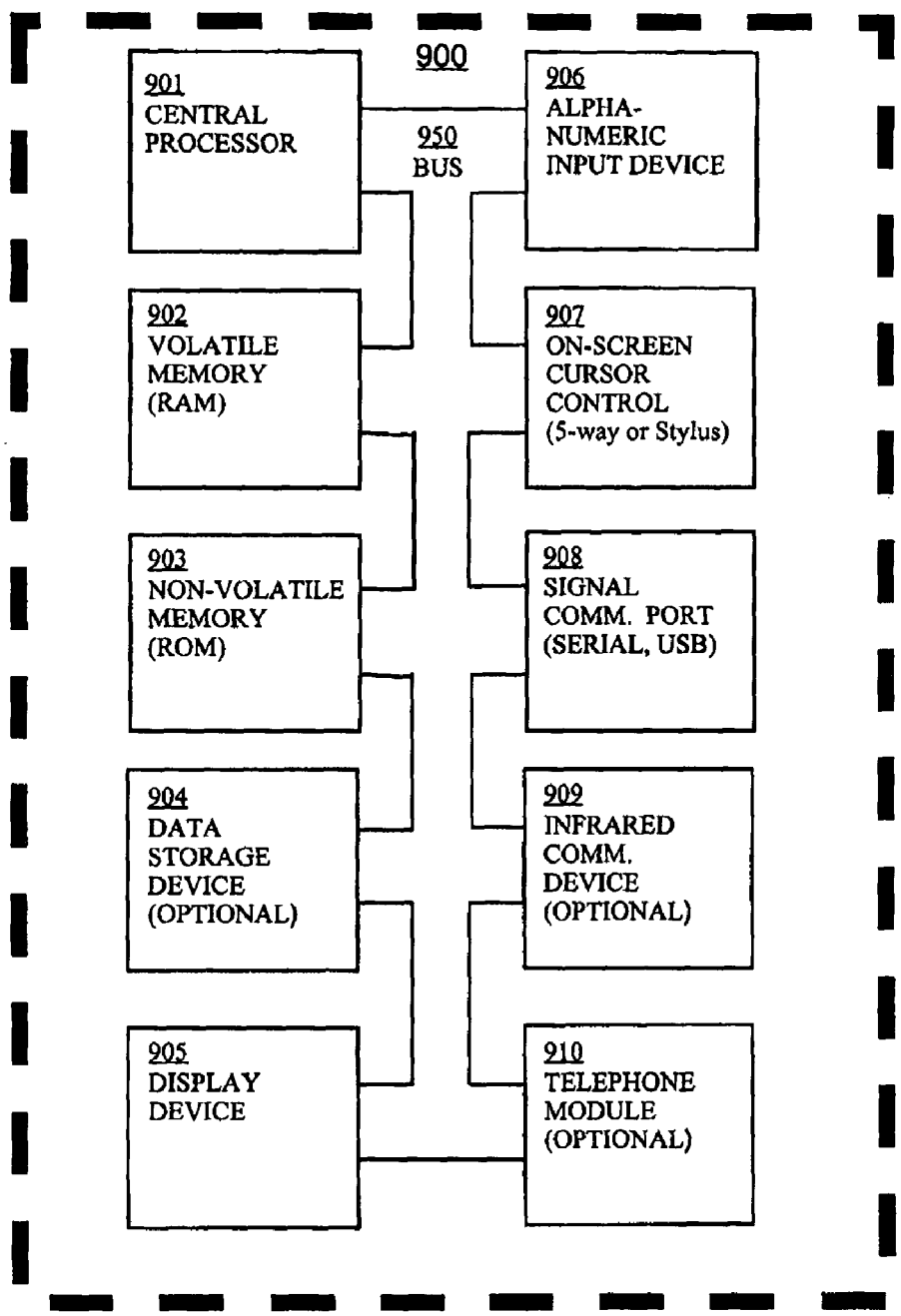
FIG. 9 illustrates an exemplary portable computer system, optionally enabled as a telephone, in accordance with an embodiment of the present invention.

Embodiments of the present invention are expected to operate in a computer system, such as a handheld computing device. A configuration typical to a generic computer system is illustrated, in block diagram form, in FIG. 9. Here, generic computer 900 is characterized by a processor 901, connected electronically by a bus 910 to a volatile memory 902, a non-volatile memory 903, possibly some form of data storage device 904 and a display device 905.

While it is noted that display device 905 can be implemented in different forms, embodiments of the present invention are implemented in devices equipped with touch-screen displays combining a liquid crystal display (LCD) screen and a pressure-sensitive input membrane overlaying the display. Other embodiments can be implemented with cathode ray tube (CRT) displays or other implementations.

Bus 950 also connects an alpha-numeric input device 906 and cursor control 907. Embodiments of the present invention are enabled to accept alpha-numeric input by reading handwritten characters in the touch-screen display. In discussions above of embodiments of the present invention, handwritten characters are written in the active input area (AIA). Other embodiments can accept alpha-numeric input from keystrokes in a keypad. Cursor control in embodiments of the present invention is by either tapping appropriate areas of the touch-screen display with a stylus or by pressing appropriate elements of a five-way navigation button.

Communication I/O device 908 can be implemented as a serial port, USB, or infrared port. In various implementations, communication I/O device 908 may be realized as a modem, an Ethernet connection, a wireless device, or any other means of communicating signals between a computer system and a communications network. Some embodiments are enabled as wireless telephones. These phone-enabled devices also are equipped with telephone module 909.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer user interface comprising:
a display to present a plurality of dynamically sizable active on-screen displayable cells for presenting categories of daily information therein, wherein said plurality of active cells comprise a first cell and a second cell, said first cell is automatically dynamically sized based on changes in its amount of content and also based on changes in an amount of content of said second cell, said second cell is automatically dynamically sized based on its amount of content and also based on said amount of content of said first cell, and said first cell is increased in size provided its content requires more size than its minimum size definition and provided further that said second cell is decreased in size below its minimum size definition.

2. A computer user interface as described in claim 1 wherein said first cell displays daily event information.

3. A computer user interface as described in claim 1 wherein said second cell displays daily to-do information.

4. A computer user interface as described in claim 1 further comprising a third cell of fixed size for on-screen displaying of daily message information.

5. A computer user interface as described in claim 1 wherein display of cells of said plurality of cells is capable of being suppressed and wherein said first cell is enlarged in response to display of said second cell being suppressed.

6. A computer user interface as described in claim 1 wherein display of cells of said plurality of cells is capable of being suppressed and wherein said second cell is enlarged in response to said first cell being suppressed.

7. A computer user interface as described in claim 1 wherein display of cells of said plurality of cells is capable of being suppressed.

8. A computer user interface as described in claim 1 wherein display of cells of said plurality of cells is capable of being suppressed and wherein said first cell is enlarged in response to display of said second cell being suppressed.

9. A computer user interface as described in claim 1 wherein said first cell comprises a minimum size definition and wherein further said first cell is decreased in size if its content requires less size than its minimum size definition.

10. A computer user interface as described in claim 1 wherein said first cell displays daily event information, wherein said second cell displays daily to-do information and further comprising a third cell of fixed size for on-screen displaying of daily message information.

11. A computer-implemented method comprising:
presenting on a display a plurality of dynamically sizable active on-screen displayable cells with categories of daily information therein, said plurality of active cells comprising a first cell and a second cell, said first cell automatically dynamically sizable based on changes in its amount of content and also based on changes in an amount of content of said second cell, said second cell automatically dynamically sizable based on its amount of content and also based on said amount of content of said first cell; and increasing a size for said first cell provided its content needs more size than its minimum size definition and provided further that said second cell needs less size than its minimum size definition.

* * * * *